United States Patent
Li

(10) Patent No.: US 11,972,529 B2
(45) Date of Patent: Apr. 30, 2024

(54) AUGMENTED REALITY SYSTEM

(71) Applicant: Snap Inc., Santa Monica, CA (US)

(72) Inventor: David Li, London (GB)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 16/265,382

(22) Filed: Feb. 1, 2019

(65) Prior Publication Data

US 2020/0250889 A1 Aug. 6, 2020

(51) Int. Cl.
| | |
|---|---|
| *G06T 19/00* | (2011.01) |
| *G06T 1/60* | (2006.01) |
| *G06T 7/246* | (2017.01) |
| *G06T 7/40* | (2017.01) |
| *G06T 7/60* | (2017.01) |
| *G06T 7/73* | (2017.01) |
| *G06T 15/04* | (2011.01) |
| *G06T 15/20* | (2011.01) |
| *G06T 17/20* | (2006.01) |

(52) U.S. Cl.
CPC .............. *G06T 19/006* (2013.01); *G06T 1/60* (2013.01); *G06T 7/246* (2017.01); *G06T 7/40* (2013.01); *G06T 7/60* (2013.01); *G06T 7/73* (2017.01); *G06T 15/04* (2013.01); *G06T 15/20* (2013.01); *G06T 17/205* (2013.01); *G06T 2207/30244* (2013.01); *G06T 2219/024* (2013.01)

(58) Field of Classification Search
CPC ......... G06T 19/006; G06T 7/60; G06T 15/04; G06T 17/205
See application file for complete search history.

(56) References Cited

U.S. PATENT DOCUMENTS

| | | | |
|---|---|---|---|
| 666,223 | A | 1/1901 | Shedlock |
| 4,581,634 | A | 4/1986 | Williams |
| 4,975,690 | A | 12/1990 | Torres |
| 5,072,412 | A | 12/1991 | Henderson, Jr. et al. |
| 5,361,205 | A | 11/1994 | Nishino et al. |
| 5,493,692 | A | 2/1996 | Theimer et al. |

(Continued)

FOREIGN PATENT DOCUMENTS

| | | |
|---|---|---|
| CA | 2887596 A1 | 7/2015 |
| CN | 102194254 A | 9/2011 |

(Continued)

OTHER PUBLICATIONS

"A Whole New Story", Snap, Inc., [Online] Retrieved from the internet: <URL: https://www.snap.com/en-US/news/>, (2017), 13 pgs.

(Continued)

*Primary Examiner* — Samantha (Yuehan) Wang
(74) *Attorney, Agent, or Firm* — SCHWEGMAN LUNDBERG & WOESSNER, P.A.

(57) ABSTRACT

The disclosure concerns an augmented reality method in which visual information concerning a real-world object, structure or environment is gathered and a deformation operation is performed on that visual information to generate virtual content that may be displayed in place of, or additionally to, real-time captured image content of the real-world object, structure or environment. Some particular embodiments concern the sharing of visual environment data and/or information characterizing the deformation operation between client devices.

20 Claims, 14 Drawing Sheets

(56) References Cited

U.S. PATENT DOCUMENTS

| | | |
|---|---|---|
| 5,699,444 A | 12/1997 | Palm |
| 5,713,073 A | 1/1998 | Warsta |
| 5,754,939 A | 5/1998 | Herz et al. |
| 5,757,383 A | 5/1998 | Lipton |
| 5,855,008 A | 12/1998 | Goldhaber et al. |
| 5,883,639 A | 3/1999 | Walton et al. |
| 5,999,932 A | 12/1999 | Paul |
| 6,009,190 A * | 12/1999 | Szeliski ............... G06K 9/209 345/427 |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,525,731 B1 * | 2/2003 | Suits ....................... G06T 15/04 345/421 |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,478,402 B2 | 1/2009 | Christensen et al. |
| 7,496,347 B2 | 2/2009 | Puranik |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,570,273 B1 | 8/2009 | de Waal |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,703,140 B2 | 4/2010 | Nath et al. |
| 7,720,554 B2 | 5/2010 | Dibernardo et al. |
| 7,737,965 B2 | 6/2010 | Alter et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,912,289 B2 | 3/2011 | Kansal et al. |
| 7,912,896 B2 | 3/2011 | Wolovitz et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,230,258 B2 | 7/2012 | Yamagami |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |

(56) References Cited

U.S. PATENT DOCUMENTS

| | | |
|---|---|---|
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,502,903 B2 | 8/2013 | Kashitani |
| 8,503,782 B2 | 8/2013 | Vincent et al. |
| 8,510,383 B2 | 8/2013 | Hurley et al. |
| 8,525,825 B2 | 9/2013 | Zhu et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,564,710 B2 | 10/2013 | Nonaka et al. |
| 8,566,325 B1 | 10/2013 | Brewington |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,676,623 B2 | 3/2014 | Gale et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,933,966 B2 | 1/2015 | Oi et al. |
| 8,972,174 B2 | 3/2015 | Jeung et al. |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,031,283 B2 | 5/2015 | Arth et al. |
| 9,040,574 B2 | 5/2015 | Wang et al. |
| 9,055,416 B2 | 6/2015 | Rosen et al. |
| 9,058,687 B2 | 6/2015 | Kruglick |
| 9,083,770 B1 | 7/2015 | Drose et al. |
| 9,092,674 B2 | 7/2015 | Andrade et al. |
| 9,094,137 B1 | 7/2015 | Sehn et al. |
| 9,098,926 B2 | 8/2015 | Quan et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,129,432 B2 | 9/2015 | Quan et al. |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,240,074 B2 | 1/2016 | Berkovich et al. |
| 9,251,144 B2 | 2/2016 | Du et al. |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,317,133 B2 | 4/2016 | Korah et al. |
| 9,317,921 B2 | 4/2016 | Chao et al. |
| 9,344,606 B2 | 5/2016 | Hartley et al. |
| 9,355,123 B2 | 5/2016 | Wnuk et al. |
| 9,361,283 B2 | 6/2016 | Jones et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,465,816 B2 | 10/2016 | Johnson et al. |
| 9,477,368 B1 | 10/2016 | Filip et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,495,783 B1 | 11/2016 | Samarasekera et al. |
| 9,495,802 B2 | 11/2016 | Komatsu |
| 9,498,720 B2 | 11/2016 | Geisner et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,785,796 B1 | 10/2017 | Murphy et al. |
| 9,825,898 B2 | 11/2017 | Sehn |
| 9,836,890 B2 | 12/2017 | Jurgenson et al. |
| 9,854,219 B2 | 12/2017 | Sehn |
| 9,922,431 B2 | 3/2018 | Gray et al. |
| 9,961,520 B2 | 5/2018 | Brooks et al. |
| 9,965,895 B1 | 5/2018 | Gray |
| 10,102,680 B2 | 10/2018 | Jurgenson et al. |
| 10,319,149 B1 * | 6/2019 | Cowburn .............. G06T 19/006 |
| 10,387,730 B1 | 8/2019 | Cowburn et al. |
| 10,497,158 B2 | 12/2019 | Jain et al. |
| 10,657,596 B1 | 5/2020 | Chavez et al. |
| 10,740,974 B1 | 8/2020 | Cowburn et al. |
| 10,984,284 B1 * | 4/2021 | Corcoran ......... G06V 30/19173 |
| 10,997,760 B2 | 5/2021 | Berger et al. |
| 11,195,018 B1 | 12/2021 | Cowburn et al. |
| 11,335,067 B2 | 5/2022 | Cowburn et al. |
| 11,450,050 B2 | 9/2022 | Berger et al. |
| 11,676,319 B2 | 6/2023 | Berger et al. |
| 2001/0056308 A1 | 12/2001 | Petrov et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0144253 A1 | 10/2002 | Kumhyr |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0040899 A1 | 2/2003 | Ogilvie |
| 2003/0052925 A1 | 3/2003 | Dalmon et al. |
| 2003/0101044 A1 | 5/2003 | Krasnov |
| 2003/0101230 A1 | 5/2003 | Benschoter et al. |
| 2003/0110503 A1 | 6/2003 | Perkes |
| 2003/0126215 A1 | 7/2003 | Udell |
| 2003/0133041 A1 | 7/2003 | Curtis et al. |
| 2003/0148773 A1 | 8/2003 | Spriestersbach et al. |
| 2003/0164856 A1 | 9/2003 | Prager et al. |
| 2003/0217106 A1 | 11/2003 | Adar et al. |
| 2003/0229607 A1 | 12/2003 | Zellweger et al. |
| 2004/0027371 A1 | 2/2004 | Jaeger |

(56) References Cited

U.S. PATENT DOCUMENTS

| | | |
|---|---|---|
| 2004/0064429 A1 | 4/2004 | Hirstius et al. |
| 2004/0078367 A1 | 4/2004 | Anderson et al. |
| 2004/0095357 A1* | 5/2004 | Oh .................... G06T 15/205 |
| | | 345/589 |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0052339 A1 | 3/2005 | Sprague |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0001758 A1 | 1/2006 | Nam et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2007/0282792 A1 | 12/2007 | Bailly et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witternan et al. |
| 2008/0055269 A1 | 3/2008 | Lemay et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0273796 A1 | 11/2008 | Kansal et al. |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0293012 A1 | 11/2009 | Alter et al. |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |

(56) References Cited

U.S. PATENT DOCUMENTS

| | | |
|---|---|---|
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0287485 A1 | 11/2010 | Bertolami et al. |
| 2010/0306669 A1 | 12/2010 | Della Pasqua |
| 2010/0315418 A1 | 12/2010 | Woo |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0090253 A1 | 4/2011 | Good |
| 2011/0096093 A1 | 4/2011 | Oi et al. |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0270584 A1 | 11/2011 | Plocher et al. |
| 2011/0273575 A1 | 11/2011 | Lee |
| 2011/0279445 A1 | 11/2011 | Murphy et al. |
| 2011/0279446 A1 | 11/2011 | Castro et al. |
| 2011/0279453 A1 | 11/2011 | Murphy et al. |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0041722 A1 | 2/2012 | Quan et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0069233 A1 | 3/2012 | Nonaka et al. |
| 2012/0084731 A1 | 4/2012 | Filman et al. |
| 2012/0084835 A1 | 4/2012 | Thomas et al. |
| 2012/0086727 A1 | 4/2012 | Korah et al. |
| 2012/0092329 A1 | 4/2012 | Koo et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113142 A1 | 5/2012 | Adhikari et al. |
| 2012/0113143 A1* | 5/2012 | Adhikari ............ G06Q 30/0623 345/633 |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0146991 A1 | 6/2012 | Bala et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0181330 A1 | 7/2012 | Kim |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212509 A1* | 8/2012 | Benko .................. G06F 3/033 345/633 |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0240077 A1 | 9/2012 | Vaittinen et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2012/0330646 A1 | 12/2012 | Andrade et al. |
| 2013/0004068 A1 | 1/2013 | Koo et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0060911 A1 | 3/2013 | Nagaraj et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0088491 A1 | 4/2013 | Hobbs et al. |
| 2013/0090171 A1 | 4/2013 | Holton et al. |
| 2013/0095857 A1 | 4/2013 | Garcia et al. |
| 2013/0103383 A1 | 4/2013 | Du et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0141419 A1 | 6/2013 | Mount et al. |

(56) References Cited

U.S. PATENT DOCUMENTS

| | | |
|---|---|---|
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0181971 A1 | 7/2013 | Mueller |
| 2013/0182133 A1 | 7/2013 | Tanabe |
| 2013/0185131 A1 | 7/2013 | Sinha et al. |
| 2013/0187952 A1 | 7/2013 | Berkovich et al. |
| 2013/0191198 A1 | 7/2013 | Carlson et al. |
| 2013/0194164 A1 | 8/2013 | Sugden et al. |
| 2013/0194301 A1 | 8/2013 | Robbins et al. |
| 2013/0198176 A1 | 8/2013 | Kim |
| 2013/0215101 A1 | 8/2013 | Duan |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0308822 A1 | 11/2013 | Marimon et al. |
| 2013/0311255 A1 | 11/2013 | Cummins et al. |
| 2013/0325964 A1 | 12/2013 | Berberat |
| 2013/0332066 A1 | 12/2013 | Jeung et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0064624 A1 | 3/2014 | Kim et al. |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0193047 A1 | 7/2014 | Grosz et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0232743 A1 | 8/2014 | Na et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0300633 A1 | 10/2014 | Sako et al. |
| 2014/0301645 A1 | 10/2014 | Mattila |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0002506 A1 | 1/2015 | Saarimäki et al. |
| 2015/0020086 A1 | 1/2015 | Chen et al. |
| 2015/0040074 A1 | 2/2015 | Hofmann et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0092038 A1 | 4/2015 | Jantunen |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0134318 A1 | 5/2015 | Cuthbert et al. |
| 2015/0145888 A1 | 5/2015 | Hanai |
| 2015/0169827 A1 | 6/2015 | Laborde |
| 2015/0172534 A1 | 6/2015 | Miyakawa et al. |
| 2015/0178257 A1 | 6/2015 | Jones et al. |
| 2015/0178260 A1 | 6/2015 | Brunson |
| 2015/0193982 A1 | 7/2015 | Mihelich et al. |
| 2015/0199082 A1 | 7/2015 | Scholler et al. |
| 2015/0222814 A1 | 8/2015 | Li et al. |
| 2015/0227602 A1 | 8/2015 | Ramu et al. |
| 2015/0228122 A1 | 8/2015 | Sadasue |
| 2015/0261917 A1 | 9/2015 | Smith |
| 2015/0294503 A1 | 10/2015 | Yang et al. |
| 2015/0312184 A1 | 10/2015 | Langholz et al. |
| 2015/0347854 A1 | 12/2015 | Bare et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0019239 A1 | 1/2016 | Bastaldo-tsampalis et al. |
| 2016/0019270 A1 | 1/2016 | Jones et al. |
| 2016/0071325 A1 | 3/2016 | Callaghan |
| 2016/0085773 A1 | 3/2016 | Chang et al. |
| 2016/0085863 A1 | 3/2016 | Allen et al. |
| 2016/0086384 A1 | 3/2016 | Stroila |
| 2016/0086670 A1 | 3/2016 | Gross et al. |
| 2016/0091964 A1 | 3/2016 | Iyer et al. |
| 2016/0099901 A1 | 4/2016 | Allen et al. |
| 2016/0104452 A1 | 4/2016 | Guan et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0203586 A1 | 7/2016 | Chang et al. |
| 2016/0217590 A1 | 7/2016 | Mullins et al. |
| 2016/0225164 A1* | 8/2016 | Tomlin .................... G06T 7/40 |
| 2016/0239248 A1 | 8/2016 | Sehn |
| 2016/0253710 A1 | 9/2016 | Publicover et al. |
| 2016/0266386 A1* | 9/2016 | Scott ..................... G06F 3/013 |
| 2016/0277419 A1 | 9/2016 | Allen et al. |
| 2016/0321708 A1 | 11/2016 | Sehn |
| 2016/0328394 A1 | 11/2016 | Cuthbert et al. |
| 2016/0352791 A1 | 12/2016 | Adams et al. |
| 2016/0359957 A1 | 12/2016 | Laliberte |
| 2016/0359987 A1 | 12/2016 | Laliberte |
| 2016/0371884 A1* | 12/2016 | Benko .................. G06T 19/006 |
| 2017/0006094 A1 | 1/2017 | Abou Mahmoud et al. |
| 2017/0061308 A1 | 3/2017 | Chen et al. |
| 2017/0103124 A1 | 4/2017 | Hassan |
| 2017/0124713 A1* | 5/2017 | Jurgenson ............... G06T 19/20 |
| 2017/0161382 A1 | 6/2017 | Ouimet et al. |
| 2017/0161558 A1 | 6/2017 | Ludwigsen et al. |
| 2017/0200296 A1 | 7/2017 | Jones et al. |
| 2017/0228878 A1 | 8/2017 | Goldman et al. |
| 2017/0237789 A1 | 8/2017 | Harner et al. |
| 2017/0243371 A1 | 8/2017 | Jurgenson et al. |
| 2017/0263029 A1 | 9/2017 | Yan et al. |
| 2017/0287006 A1 | 10/2017 | Azmoodeh et al. |
| 2017/0289623 A1 | 10/2017 | Bailey et al. |

(56) References Cited

U.S. PATENT DOCUMENTS

| | | | |
|---|---|---|---|
| 2017/0295250 A1 | 10/2017 | Samaranayake et al. | |
| 2017/0308272 A1 | 10/2017 | Levien et al. | |
| 2017/0372526 A1 | 12/2017 | Groten et al. | |
| 2017/0374003 A1 | 12/2017 | Allen et al. | |
| 2017/0374508 A1 | 12/2017 | Davis et al. | |
| 2018/0061127 A1 | 3/2018 | Gullicksen | |
| 2018/0089882 A1 | 3/2018 | Alkouh | |
| 2018/0089904 A1 | 3/2018 | Jurgenson et al. | |
| 2018/0096502 A1 | 4/2018 | Kansara | |
| 2018/0144524 A1 | 5/2018 | Lotto et al. | |
| 2018/0144547 A1 | 5/2018 | Shakib et al. | |
| 2018/0189552 A1 | 7/2018 | Barnett et al. | |
| 2018/0204372 A1 | 7/2018 | Sudheendra et al. | |
| 2019/0073832 A1* | 3/2019 | Kim | G06T 19/003 |
| 2019/0096113 A1 | 3/2019 | Stukalov | |
| 2019/0156534 A1* | 5/2019 | Chen | G06T 1/20 |
| 2019/0164346 A1 | 5/2019 | Kim et al. | |
| 2019/0347323 A1 | 11/2019 | Riesa et al. | |
| 2020/0020173 A1 | 1/2020 | Sharif | |
| 2020/0058151 A1 | 2/2020 | Stukalov | |
| 2020/0074705 A1 | 3/2020 | Berger et al. | |
| 2021/0056760 A1 | 2/2021 | Cowburn et al. | |
| 2021/0166455 A1 | 6/2021 | Berger et al. | |
| 2021/0375044 A1* | 12/2021 | George | G06T 15/04 |
| 2022/0076017 A1 | 3/2022 | Cowburn et al. | |
| 2022/0254124 A1 | 8/2022 | Cowburn et al. | |
| 2022/0343574 A1 | 10/2022 | Berger et al. | |
| 2023/0222743 A1 | 7/2023 | Cowburn et al. | |
| 2023/0290026 A1 | 9/2023 | Berger et al. | |

FOREIGN PATENT DOCUMENTS

| | | |
|---|---|---|
| CN | 104076920 A | 10/2014 |
| CN | 105719350 A | 6/2016 |
| CN | 106937531 | 7/2017 |
| CN | 107209950 A | 9/2017 |
| CN | 108242082 A | 7/2018 |
| CN | 110199245 A | 9/2019 |
| CN | 112639892 A | 4/2021 |
| CN | 113396443 A | 9/2021 |
| EP | 2051480 A1 | 4/2009 |
| EP | 2151797 A1 | 2/2010 |
| EP | 2439676 A1 | 4/2012 |
| EP | 3147816 A2 | 3/2017 |
| GB | 2399928 A | 9/2004 |
| KR | 19990073076 A | 10/1999 |
| KR | 20010078417 A | 8/2001 |
| KR | 20150107063 A | 9/2015 |
| KR | 20170018930 A | 2/2017 |
| KR | 20180026291 A | 3/2018 |
| KR | 20180087918 A | 8/2018 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2013003242 A1 | 1/2013 |
| WO | WO-2013008238 A1 | 1/2013 |
| WO | WO-2013008251 A2 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015069737 A2 | 5/2015 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016149594 A1 | 9/2016 |
| WO | WO-2016179166 A1 | 11/2016 |
| WO | WO-2016179235 A1 | 11/2016 |
| WO | WO-2017120660 A1 | 7/2017 |
| WO | WO-2017176739 A1 | 10/2017 |
| WO | WO-2017176992 A1 | 10/2017 |
| WO | WO-2018005644 A1 | 1/2018 |
| WO | WO-2018128930 | 7/2018 |
| WO | WO-2020047259 A1 | 3/2020 |
| WO | WO-2020160261 A1 | 8/2020 |

OTHER PUBLICATIONS

"Adding photos to your listing", eBay, [Online] Retrieved from the internet: <URL: http://pages.ebay.com/help/sell/pictures.html>, (accessed May 24, 2017), 4 pgs.

"U.S. Appl. No. 14/954,090, Corrected Notice of Allowance dated Feb. 3, 2017", 4 pgs.

"U.S. Appl. No. 14/954,090, Corrected Notice of Allowance dated Apr. 18, 2017", 4 pgs.

"U.S. Appl. No. 14/954,090, Notice of Allowance dated Jan. 11, 2017", 11 pgs.

"U.S. Appl. No. 14/954,090, Preliminary Amendment filed Dec. 28, 2016", 10 pgs.

"U.S. Appl. No. 15/436,363, Examiner Interview Summary dated Nov. 28, 2018", 3 pgs.

"U.S. Appl. No. 15/436,363, Non Final Office Action dated Oct. 9, 2018", 15 pgs.

"U.S. Appl. No. 15/436,363, Notice of Allowance dated Jan. 29, 2019", 8 pgs.

"U.S. Appl. No. 15/436,363, Response filed Nov. 28, 2018 to Non Final Office Action dated Oct. 9, 2018", 15 pgs.

"U.S. Appl. No. 15/492,089, Non Final Office Action dated Jan. 25, 2019", 7 pgs.

"U.S. Appl. No. 15/492,089, Notice of Allowance dated Apr. 4, 2019", 9 pgs.

"U.S. Appl. No. 15/492,089, Response filed Feb. 26, 2019 to Non Final Office Action dated Jan. 25, 2019", 11 pgs.

"U.S. Appl. No. 15/591,887, Corrected Notice of Allowance dated Sep. 8, 2017", 4 pgs.

"U.S. Appl. No. 15/591,887, Notice of Allowance dated Aug. 25, 2017", 10 pgs.

"U.S. Appl. No. 15/591,887, Preliminary Amendment filed Jun. 12, 2017", 10 pgs.

"U.S. Appl. No. 15/591,887, PTO Response to Rule 312 Communication dated Sep. 19, 2017", 2 pgs.

"U.S. Appl. No. 15/706,074, Non Final Office Action dated Nov. 7, 2018", 26 pgs.

"U.S. Appl. No. 15/706,074, Response filed Mar. 28, 2019 to Non Final Office Action dated Nov. 7, 2018", 14 pgs.

"U.S. Appl. No. 15/830,965, Corrected Notice of Allowability dated Aug. 6, 2018", 4 pgs.

"U.S. Appl. No. 15/830,965, Non Final Office Action dated Feb. 16, 2018", 7 pgs.

"U.S. Appl. No. 15/830,965, Notice of Allowability dated Jul. 5, 2018", 5 pgs.

"U.S. Appl. No. 15/830,965, Notice of Allowance dated Jun. 13, 2018", 8 pgs.

"U.S. Appl. No. 15/830,965, Response filed May 16, 2018 to Non Final Office Action dated Feb. 16, 2018", 10 pgs.

"U.S. Appl. No. 16/135,849, Preliminary Amendment filed Oct. 15, 2018", 10 pgs.

"U.S. Appl. No. 16/136,849, Non Final Office Action dated Oct. 17, 2018", 4 pgs.

"U.S. Appl. No. 16/136,849, Response filed )Jan. 17, 2019 to Non Final Office Action dated Oct. 17, 2018", 9 pgs.

"BlogStomp", StompSoftware, [Online] Retrieved from the internet: <URL: http://stompsoftware.com/blogstomp>, (accessed May 24, 2017), 12 pgs.

(56) References Cited

OTHER PUBLICATIONS

"Cup Magic Starbucks Holiday Red Cups come to life with AR app", Blast Radius, [Online] Retrieved from the internet: <URL: http://www.blastradius.com/work/cup-magic>, (2016), 7 pgs.

"Daily App: InstaPlace (iOS/Android): Give Pictures a Sense of Place", TechPP, [Online] Retrieved from the internet: <URL: http://techpp.com/2013/02/15/instaplace-app-review>, (2013), 13 pgs.

"Deltatre and Vizrt expanding partnership for Magma Pro Football solution", Vizrt, [Online] Retrieved from the internet: <URL: http://www.vizrt.com/news/newsgrid/39609/deltatre_and_Vizrt_expanding_partnership_for_Magma_Pro_Football_solution>, (2013), 5 pgs.

"InstaPlace Photo App Tell The Whole Story", [Online] Retrieved from the internet: <URL: https://youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"Introducing Snapchat Stories", [Online] Retrieved from the internet: <URL: https://www.youtube.com/watch?v=88Cu3yN-LIM>, (Oct. 3, 2013), 92 pgs.

"Macy's Believe-o-Magic", [Online] Retrieved from the internet: <URL: https://www.youtube.com/watch?v=xvzRXy3J0Z0>, (Nov. 7, 2011), 102 pgs.

"Macys Introduces Augmented Reality Experience in Stores across Country as Part of Its 2011 Believe Campaign", Business Wire, [Online] Retrieved from the internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the internet: <URL: https://www.youtube.com/watch?v=RWwQXi9RG0w>, (Nov. 8, 2011), 87 pgs.

"Starbucks Cup Magic for Valentine's Day", [Online] Retrieved from the internet: <URL: https://www.youtube.com/watch?v=8nvqOzjq10w>, (Feb. 6, 2012), 88 pgs.

"Starbucks Holiday Red Cups Come to Life, Signaling the Return of the Merriest Season". Business Wire, [Online] Retrieved from the internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the internet: <URL: https://techcrunch.com/2011/09/08/mobli-filters>, (Sep. 8, 2011), 10 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Janthong, Isaranu, "Instaplace ready on Android Google Play store", Android App Review Thailand, [Online] Retrieved from the internet: <URL: http://www.android-free-app-review.com/2013/01/instaplace-android-google-play-store.html>, (Jan. 23, 2013), 9 pgs.

Klein, Georg, "Parallel Tracking and Mapping for Small AR Workspaces—Source Code", PTAM Blog, [Online] Retrieved from the Internet on Apr. 3, 2019: <URL: www.robots.ox.ac.uk/~gk/PTAM/>, (Feb. 2014), 2 pgs.

Leyden, John, "This SMS will self-destruct in 40 seconds", [Online] Retrieved from the internet: <URL: http://www.theregister.co.uk/2005/12/12/stealthtext/>, (Dec. 12, 2005), 1 pg.

MacLeod, Duncan, "Macys Believe-o-Magic App", [Online] Retrieved from the internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the internet: <URL: http://theinspirationroom.com/daily/2011/starbucks-cup-magic>, (Nov. 12, 2011), 8 pgs.

Maher, Mary Lou, et al., "Designworld: An Augmented 3D Virtual World for Multidisciplinary, Collaborative Design", University of Sydney, Key Centre for Design Computing and Cognition, (2006), 10 pgs.

Melanson, Mike, "This text message will self-destruct in 60 seconds", [Online] Retrieved from the internet: <URL: http://readwrite.com/2011/02/11/this_text_message_will_self_destruct_in_60_seconds> (Feb. 18, 2015), 4 pgs.

Notopoulos, Katie, "A Guide To The New Snapchat Filters And Big Fonts", [Online] Retrieved from the internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved from the internet: <URL: https://techcrunch.com/2013/12/20/snapchat-adds-filters-new-font-and-for-some-reason-time-temperature-and-speed-overlays/>, (Dec. 20, 2013), 12 pgs.

Rosten, Edward, "Fast Corner Detection", Edwardrosten.com, [Online] Retrieved from the Internet on Apr. 3, 2019: <URL: https://www.edwardrosten.com/work/fast.html>, (Feb. 25, 2018), 5 pgs.

Sawers, Paul, "Snapchat for iOS Lets You Send Photos to Friends and Set How long They're Visible For", [Online] Retrieved from the internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Tripathi, Rohit, "Watermark Images in PHP And Save File on Server", [Online] Retrieved from the internet: <URL: http://code.rohitink.com/2012/12/28/watermark-images-in-php-and-save-file-on-server>, (Dec. 28, 2012), 4 pgs.

Vaas, Lisa, "StealthText, Should You Choose to Accept It", [Online] Retrieved from the internet: <URL: http://www.eweek.com/print/c/a/MessagingandCollaboration/StealthTextShouldYouChoosetoAcceptit>, (Dec. 13, 2005), 2 pgs.

Wagner, Daniel, et al., "Pose Tracking from Natural Features on Mobile Phones", Proc. of the 7th IEEE/ACM Intl. Symposium on Mixed and Augmented Reality, IEEE Computer Society, (2008), 10 pgs.

U.S. Appl. No. 15/436,363, filed Feb. 17, 2017, Augmented Reality Anamorphosis System.

U.S. Appl. No. 16/277,626, filed Feb. 15, 2019, Augmented Reality Anamorphosis System.

U.S. Appl. No. 15/492,089, filed Apr. 20, 2017, Augmented Reality Typography Personalization System.

U.S. Appl. No. 15/706,074, filed Sep. 15, 2017, Augmented Reality System.

U.S. Appl. No. 16/119,397, filed Aug. 31, 2018, Augmented Reality Anthropomorphization System.

"U.S. Appl. No. 16/119,397, Final Office Action dated Aug. 21, 2020", 18 pgs.

"U.S. Appl. No. 16/119,397, Non Final Office Action dated Oct. 1, 2020", 18 pgs.

"U.S. Appl. No. 16/119,397, Notice of Allowance dated Dec. 28, 2020", 9 pgs.

"U.S. Appl. No. 16/119,397, Response filed Sep. 2, 2020 to Final Office Action dated Aug. 21, 2020", 12 pgs.

"U.S. Appl. No. 16/119,397, Response filed Nov. 16, 2020 to Non Final Office Action dated Oct. 1, 2020", 13 pgs.

"U.S. Appl. No. 16/277,626, Final Office Action dated Aug. 10, 2020", 35 pgs.

"U.S. Appl. No. 16/277,626, Non Final Office Action dated Nov. 30, 2020", 19 pgs.

"U.S. Appl. No. 16/277,626, Response filed Jan. 28, 2021 to Non Final Office Action dated Nov. 30, 2020", 9 pgs.

"U.S. Appl. No. 16/277,626, Response filed Aug. 19, 2020 to Final Office Action dated Aug. 10, 2020", 10 pgs.

"U.S. Appl. No. 16/433,793, Non Final Office Action dated Jan. 21, 2021", 26 pgs.

"U.S. Appl. No. 16/921,487, Preliminary Amendment filed Nov. 16, 2020", 8 pgs.

Nahar, Prakhar, et al., "Autonomous UAV Forced Graffiti Detection and Removal System Based on Machine Learning", IEEE 2017 SmartWorld/SCALCOM/UIC/ATC/CBDCom/IOP/SCI, (2017), 8 pgs.

(56) References Cited

OTHER PUBLICATIONS

Narhare, Ashwini D, et al., "Trademark detection using SIFT features matching", IEEE 2015 International Conference on Computing Communication Control and Automation, (2015), 684-688.

Sheikh, MD. Abdul Alim, et al., "Traffic Sign Detection and Classification using Colour Feature and Neural Network", IEEE 2016 International Conference on Intelligent Control Power and Instrumentation (ICICPI), (2016), 307-311.

U.S. Appl. No. 16/433,793, filed Jun. 6, 2019, Augmented Reality Typography Personalization System.

U.S. Appl. No. 16/921,487, filed Jul. 6, 2020, Augmented Reality System.

U.S. Appl. No. 17/248,835, filed Feb. 10, 2021, Augmented Reality Anthropomorphization System.

"U.S. Appl. No. 16/277,626, Final Office Action dated Feb. 22, 2021", 18 pgs.

"U.S. Appl. No. 16/277,626, Final Office Action dated Aug. 20, 2021", 24 pgs.

"U.S. Appl. No. 16/277,626, Non Final Office Action dated Jul. 12, 2021", 20 pgs.

"U.S. Appl. No. 16/277,626, Response filed May 11, 2021 to Final Office Action dated Feb. 22, 2021", 10 pgs.

"U.S. Appl. No. 16/277,626, Response filed Aug. 10, 2021 to Non Final Office Action dated Jul. 12, 2021", 9 pages.

"U.S. Appl. No. 16/433,793, Final Office Action dated Apr. 30, 2021", 9 pgs.

"U.S. Appl. No. 16/433,793, Notice of Allowance dated Aug. 6, 2021", 14 pgs.

"U.S. Appl. No. 16/433,793, Response filed Apr. 21, 2021 to Non Final Office Action dated Jan. 21, 2021", 12 pgs.

"U.S. Appl. No. 16/433,793, Response filed Jun. 30, 2021 to Final Office Action dated Apr. 30, 2021", 9 pages.

"U.S. Appl. No. 16/921,487, Non Final Office Action dated Jun. 10, 2021", 19 pgs.

"U.S. Appl. No. 16/921,487, Response filed Sep. 10, 2021 to Non Final Office Action dated Jun. 10, 2021", 12 pgs.

"International Application Serial No. PCT/US2019/048817, International Preliminary Report on Patentability dated Mar. 11, 2021", 7 pgs.

"International Application Serial No. PCT/US2020/015868, International Preliminary Report on Patentability dated Aug. 12, 2021", 17 pgs.

"U.S. Appl. No. 16/277,626, Non Final Office Action dated Nov. 29, 2021", 19 pgs.

"U.S. Appl. No. 16/277,626, Response filed Oct. 21, 2021 to Final Office Action dated Aug. 20, 2021", 11 pgs.

"U.S. Appl. No. 16/921,487, Corrected Notice of Allowability dated Feb. 1, 2022", 2 pgs.

"U.S. Appl. No. 16/921,487, Final Office Action dated Oct. 15, 2021", 22 pgs.

"U.S. Appl. No. 16/921,487, Notice of Allowance dated Jan. 12, 2022", 5 pgs.

"U.S. Appl. No. 16/921,487, Response filed Dec. 15, 2021 to Final Office Action dated Oct. 15, 2021", 12 pgs.

"U.S. Appl. No. 17/248,835, Final Office Action dated Jan. 31, 2022", 18 pgs.

"U.S. Appl. No. 17/248,835, Non Final Office Action dated Oct. 1, 2021", 18 pgs.

"U.S. Appl. No. 17/248,835, Response filed Nov. 29, 2021 to Non Final Office Action dated Oct. 1, 2021", 12 pgs.

"European Application Serial No. 19854093.2, Extended European Search Report dated Sep. 27, 2021", 7 pgs.

"Korean Application Serial No. 10-2021-7009066, Notice of Preliminary Rejection dated Mar. 14, 2022", w/ English translation, 10 pgs.

U.S. Appl. No. 17/729,678, filed Apr. 26, 2022, Augmented Reality System.

U.S. Appl. No. 17/812,071, filed Jul. 12, 2022, Augmented Reality Anthropomorphization System.

"U.S. Appl. No. 16/277,626, Final Office Action dated Apr. 15, 2022", 23 pgs.

"U.S. Appl. No. 16/277,626, Final Office Action dated Aug. 19, 2022", 23 pgs.

"U.S. Appl. No. 16/277,626, Non Final Office Action dated Jul. 12, 2022", 22 pgs.

"U.S. Appl. No. 16/277,626, Response filed Mar. 29, 2022 to Non Final Office Action dated Nov. 29, 2021", 9 pgs.

"U.S. Appl. No. 16/277,626, Response filed May 13, 2022 to Final Office Action dated Apr. 15, 2022", 10 pgs.

"U.S. Appl. No. 16/277,626, Response filed Jul. 27, 2022 to Non Final Office Action dated Jul. 12, 2022", 10 pgs.

"U.S. Appl. No. 16/277,626, Response filed Sep. 15, 2022 to Final Office Action dated Aug. 19, 2022", 10 pgs.

"U.S. Appl. No. 17/248,835, Notice of Allowance dated May 17, 2022", 9 pgs.

"U.S. Appl. No. 17/248,835, Response filed Apr. 27, 2022 to Final Office Action dated Jan. 31, 2022", 11 pgs.

"U.S. Appl. No. 17/812,071, Non Final Office Action dated Sep. 29, 2022", 20 pgs.

"Korean Application Serial No. 10-2021-7027590, Notice of Preliminary Rejection dated Jul. 11, 2022", W/English Translation, 11 pgs.

"U.S. Appl. No. 16/277,626, Final Office Action dated Nov. 14, 2022", 30 pgs.

"U.S. Appl. No. 16/277,626, Non Final Office Action dated Oct. 7, 2022", 25 pgs.

"U.S. Appl. No. 16/277,626, Response filed Jan. 10, 2023 to Final Office Action dated Nov. 14, 2022", 11 pgs.

"U.S. Appl. No. 16/277,626, Response filed Oct. 26, 2022 to Non Final Office Action dated Oct. 7, 2022", 11 pgs.

"U.S. Appl. No. 17/812,071, Final Office Action dated Nov. 17, 2022", 17 pgs.

"U.S. Appl. No. 17/812,071, Response filed Jan. 12, 2023 to Final Office Action dated Nov. 17, 2022", 11 pgs.

"U.S. Appl. No. 17/812,071, Response filed Oct. 26, 2022 to Non Final Office Action dated Sep. 29, 2022", 12 pgs.

"Korean Application Serial No. 10-2021-7027590, Response filed Oct. 11, 2022 to Notice of Preliminary Rejection dated Jul. 11, 2022", w/ English Claims, 17 pgs.

"U.S. Appl. No. 15/492,089, Corrected Notice of Allowability dated May 24, 2019", 2 pgs.

"U.S. Appl. No. 15/706,074, Examiner Interview Summary dated Feb. 5, 2020", 3 pgs.

"U.S. Appl. No. 15/706,074, Examiner Interview Summary dated Jul. 3, 2019", 3 pgs.

"U.S. Appl. No. 15/706,074, Examiner Interview Summary dated Nov. 1, 2019", 3 pgs.

"U.S. Appl. No. 15/706,074, Final Office Action dated May 10, 2019", 28 pgs.

"U.S. Appl. No. 15/706,074, Final Office Action dated Dec. 19, 2019", 32 pgs.

"U.S. Appl. No. 15/706,074, Non Final Office Action dated Sep. 18, 2019", 29 pgs.

"U.S. Appl. No. 15/706,074, Notice of Allowance dated Mar. 30, 2020", 5 pgs.

"U.S. Appl. No. 15/706,074, Response filed Mar. 19, 2020 to Final Office Action dated Dec. 19, 2019", 12 pgs.

"U.S. Appl. No. 15/706,074, Response filed Jul. 8, 2019 to Final Office Action dated May 10, 2019", 17 pgs.

"U.S. Appl. No. 15/706,074, Response filed Nov. 11, 2019 to Non Final Office Action dated Sep. 18, 2019", 13 pgs.

"U.S. Appl. No. 16/119,397, Final Office Action dated May 21, 2020", 17 pgs.

"U.S. Appl. No. 16/119,397, Non Final Office Action dated Jun. 19, 2020", 17 pgs.

"U.S. Appl. No. 16/119,397, Non Final Office Action dated Nov. 15, 2019", 14 pgs.

"U.S. Appl. No. 16/119,397, Response filed Feb. 18, 2020 to Non Final Office Action dated Nov. 15, 2019", 12 pgs.

"U.S. Appl. No. 16/119,397, Response filed May 29, 2020 to Final Office Action dated May 21, 2020", 12 pgs.

(56) References Cited

OTHER PUBLICATIONS

"U.S. Appl. No. 16/119,397, Response filed Jul. 14, 2020 to Non Final Office Action dated Jun. 19, 2020", 12 pgs.
"U.S. Appl. No. 16/277,626, Examiner Interview Summary dated Apr. 7, 2020", 3 pgs.
"U.S. Appl. No. 16/277,626, Final Office Action dated May 18, 2020", 30 pgs.
"U.S. Appl. No. 16/277,626, Non Final Office Action dated Mar. 24, 2020", 28 pgs.
"U.S. Appl. No. 16/277,626, Non Final Office Action dated Jul. 13, 2020", 34 pgs.
"U.S. Appl. No. 16/277,626, Response filed Apr. 28, 2020 to Non Final Office Action dated Mar. 24, 2020", 12 pgs.
"U.S. Appl. No. 16/277,626, Response filed May 29, 2020 to Final Office Action dated May 18, 2020", 12 pgs.
"U.S. Appl. No. 16/277,626, Response filed Jul. 16, 2020 to Non Final Office Action dated Jul. 13, 2020", 10 pgs.
"International Application Serial No. PCT/US2019/048817, International Search Report dated Dec. 13, 2019", 3 pgs.
"International Application Serial No. PCT/US2019/048817, Written Opinion dated Dec. 13, 2019", 5 pgs.
"International Application Serial No. PCT/US2020/015868, International Search Report dated Jul. 10, 2020", 5 pgs.
"International Application Serial No. PCT/US2020/015868, Invitation to Pay Additional Fees dated May 19, 2020", 14 pgs.
"International Application Serial No. PCT/US2020/015868, Written Opinion dated Jul. 10, 2020", 15 pgs.
"Skrite Full Length Commercial", Youtube, [Online] Retrieved from the Internet: <URL: https://www.youtube.com/watch?v=nNx5VeSpk_Y>, (Jun. 27, 2017), 62 pgs.; 1:00 min.
Park, Jungsik, et al., "Interactive deformation of real objects", IEEE International Symposium on Mixed and Augmented Reality (ISMAR), (Sep. 10, 2014), 295-296.
Raskar, R, et al., "Table-top spatially-augmented realty: bringing physical models to life with projected imagery", Augmented Reality, Proceedings. 2nd IEEE and ACM International Workshop on San Francisco, CA, (Oct. 20-21, 1999), 64-71.
Taejin, HA, et al., "ARtalet: Tangible User Interface Based Immersive Augmented Reality Authoring Tool for Digilog Book", Ubiquitous Virtual Reality (ISUVR), International Symposium on, IEEE, Piscataway, NJ, USA, (Jul. 7, 2010), 40-43.
"U.S. Appl. No. 16/277,626, Notice of Allowance dated Feb. 9, 2023", 10 pgs.
"U.S. Appl. No. 17/528,981, Non Final Office Action dated Jun. 29, 2023", 15 pgs.
"U.S. Appl. No. 17/729,678, Non Final Office Action dated Feb. 16, 2023", 16 pgs.
"U.S. Appl. No. 17/729,678, Notice of Allowance dated Mar. 20, 2023", 8 pgs.
"U.S. Appl. No. 17/729,678, Response filed Feb. 24, 2023 to Non Final Office Action dated Feb. 16, 2023", 9 pgs.
"U.S. Appl. No. 17/812,071, Notice of Allowance dated Feb. 6, 2023", 8 pgs.
"European Application Serial No. 19854093.2, Communication Pursuant to Article 94(3) EPC dated Jun. 29, 2023", 5 pgs.
Haritaoglu, Ismail, "Scene Text Extraction and Translation for Handheld Devices", (2001), 408-413.
Zhang, Honggang, et al., "Text extraction from natural scene image: A survey", Neurocomputing, vol. 122, (2013), 310-323.
"U.S. Appl. No. 16/277,626, Corrected Notice of Allowability mailed Oct. 26, 2023", 3 pgs.
"U.S. Appl. No. 16/277,626, Corrected Notice of Allowability mailed Nov. 6, 2023", 5 pgs.
"U.S. Appl. No. 17/528,981, Final Office Action mailed Dec. 5, 2023", 16 pgs.
"U.S. Appl. No. 17/528,981, Response filed Sep. 15, 2023 to Non Final Office Action mailed Jun. 29, 2023", 11 pgs.
"U.S. Appl. No. 18/119,112, Final Office Action mailed Oct. 26, 2023", 20 pgs.
"U.S. Appl. No. 18/119,112, Response filed Oct. 6, 2023 to Non Final Office Action mailed Sep. 6, 2023", 10 pgs.
"Chinese Application Serial No. 202080011762.5, Office Action mailed Jul. 27, 2023", w/ English Translation, 27 pgs.
Chang, Yi, et al., "An image-based automatic Arabic translation system", Pattern Recognition, vol. 42, Issue 9, (Sep. 2009), 2127-2134.
Pu, Muhammad, et al., "Framework based on Mobile Augmented Reality for Translating Food Menu in Thai Language to Malay Language", International Journal on Advanced Science Engineering Information Technology, vol. 7, No. 1, (2017), 153-159.
"U.S. Appl. No. 18/119,112, Response filed Dec. 19, 2023 to Final Office Action mailed Oct. 26, 2023", 10 pgs.
"Chinese Application Serial No. 201980056291.7, Office Action mailed Sep. 28, 2023", w English Translation, 22 pgs.
"U.S. Appl. No. 17/528,981, Notice of Allowance mailed Feb. 27, 2024", 11 pgs.
"U.S. Appl. No. 17/528,981, Response filed Feb. 5, 2024 to Final Office Action mailed Dec. 5, 2023", 10 pgs.
"U.S. Appl. No. 18/119,112, Non Final Office Action mailed Jan. 8, 2024", 21 pgs.
"U.S. Appl. No. 18/133,469, Non Final Office Action mailed Feb. 29, 2024", 20 pgs.
"U.S. Appl. No. 18/320,628, Non Final Office Action mailed Feb. 1, 2024", 17 pgs.
"Chinese Application Serial No. 201980056291.7, Response filed Feb. 18, 2024 to Office Action mailed Sep. 28, 2023", w/ English Claims, 14 pgs.
"Korean Application Serial No. 10-2023-7016588, Notice of Preliminary Rejection mailed Jan. 5, 2024", w/ English Translation, 11 pgs.

* cited by examiner

AUGMENTED REALITY SYSTEM

BACKGROUND

Augmented reality (AR) refers to using computer generated enhancements to add new information into images in a real-time or near real-time fashion. For example, video images of a wall output on a display of a device may be enhanced with display details that are not present on the wall, but that are generated to appear as if they are on the wall by an augmented reality system. Such systems require a complex mix of image capture information that is integrated and matched with the augmented reality information that is to be added to a captured scene in a way that attempts to seamlessly present a final image from a perspective determined by the image capture device.

BRIEF DESCRIPTION OF THE SEVERAL VIEWS OF THE DRAWINGS

Various ones of the appended drawings merely illustrate example embodiments of the present disclosure and should not be considered as limiting its scope.

To easily identify the discussion of any particular element or act, the most significant digit or digits in a reference number refer to the figure number in which that element is first introduced.

DETAILED DESCRIPTION

Glossary

Figure 1A:
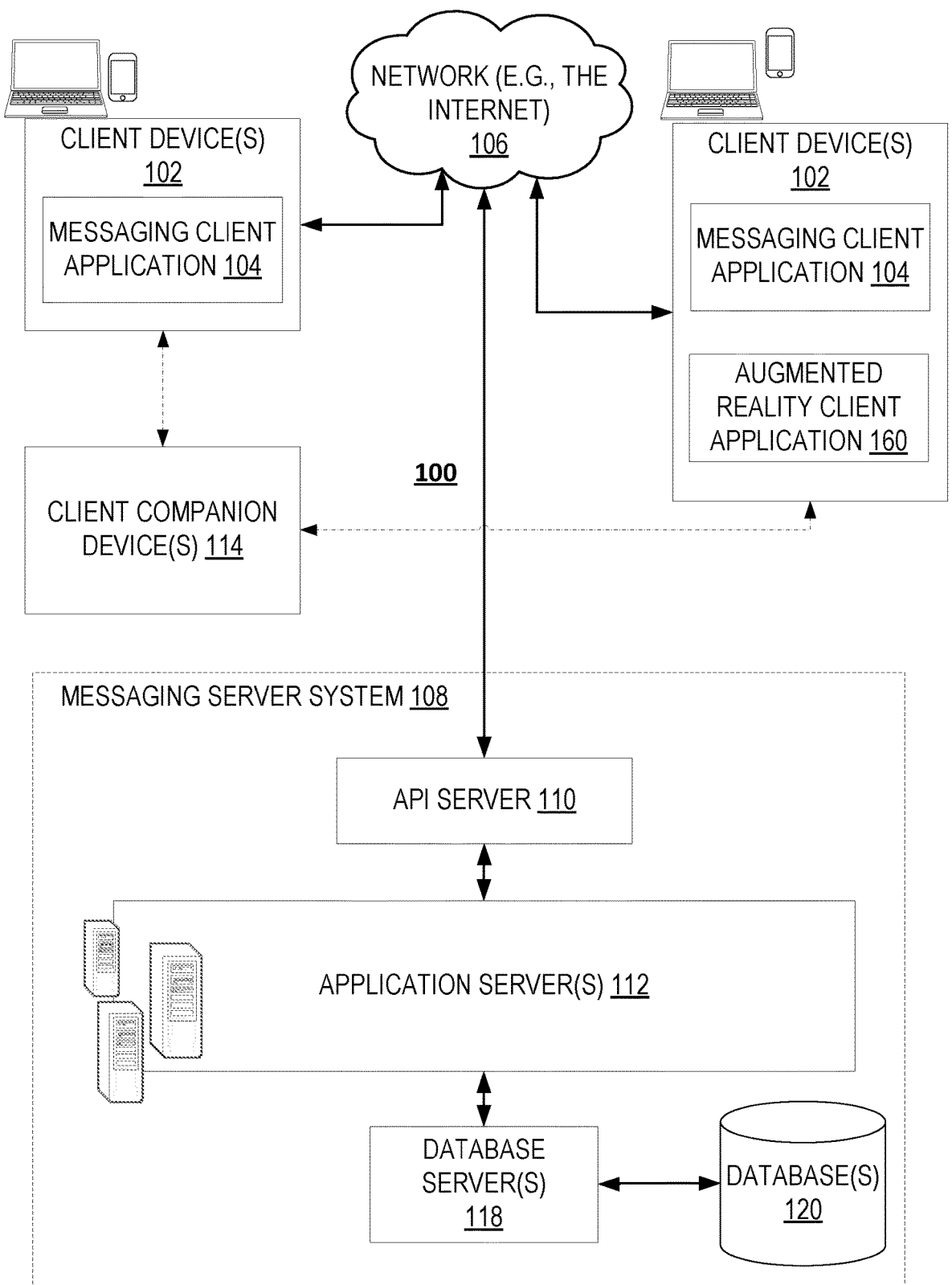
FIG. 1A is a block diagram showing an example messaging system for exchanging data (e.g., messages and associated content) over a network.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, augmented reality content, a video and the like. The access time for the ephemeral message may be set by the message sender. Alternatively, the access time may be a default setting or a setting specified by the recipient. Regardless of the setting technique, the message is transitory.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"MACHINE-READABLE MEDIUM" in this context refers to a component, device or other non-transitory, tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. Unless qualified by the term "non-transitory", the term "machine-readable medium" should also be taken to include carrier signals and other transitory media capable of storing instructions and data temporarily or permanently.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

SUMMARY

The following relates to augmented reality image processing and reproduction of augmented reality content. Some particular embodiments describe obtaining visual information concerning a real-world object, structure or environment and applying a deformation operation on that visual information to generate virtual content that may be displayed in place of, or additionally to, real-time captured image content of the real-world object, structure or environment. Some particular embodiments describe using an initial rough location estimate to identify visual environment data, including 3D point cloud models, texture data and façade data, that describe objects, buildings, structures etc. that are local to that initial rough location estimate. Some particular embodiments describe processing of images captured by a client device to generate visual environment data, including 3D point cloud models, texture data and façade data, that describe real-world objects, buildings, structures etc. Some particular embodiments concern the sharing of visual environment data and/or information characterizing the deformation operation between client devices.

The description that follows includes systems, devices, and methods that illustrate embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Augmented reality, as described herein, refers to systems and devices that capture images of real-world objects or environments in the field of view of a capture device or user and enhance those images with additional information, and then present the enhanced information on a display. This enables, for example, a user to capture a video stream of a scene or environment using a camera function of a smartphone or wearable device, and an output display of the smartphone or wearable device to present the scene as visible to the user along with additional information. This additional information may include placing virtual objects in the scene or environment so the virtual objects are presented as if they existed in the scene. Aspects of such virtual objects are processed to occlude the virtual object if another real or virtual object passes in front of the virtual object as shown from the perspective of the image sensor capturing the environment. Such virtual objects are also processed to maintain their relationship with real objects as both real and virtual objects move over time, and as the perspective (i.e. orientation, pose and/or location) of the image sensor capturing the environment changes. Examples of virtual objects include video images, still content, text information, three dimensional animations and hologram representations, conventional multimedia content displayed upon a virtual two dimensional surface overlaying a blank real-world wall, and visual effects applied to at least a portion of the output display of a user device.

For clarity, the terms "real" and "real-world" are used herein to refer to objective physical reality. Images of real, material, objects and environments may be captured in a physical image capture device, such as a digital camera, and these images will replicate the user's own perception of such objects or environments. The term "real" contrasts with "virtual", the latter term denoting the operation of computer simulation. Augmented reality (AR) may therefore be considered to represent an intermediate level of abstraction in a continuum between objective reality and a fully simulated or "virtual" reality (VR). AR, as used herein, therefore refers to a reality that mixes real and virtual elements to varying degrees. Where the virtual elements dominate, some authors would adopt the term "augmented virtuality". For simplicity, the term augmented reality is used here to refer to any mixed reality, specifically including (real-element dominated) "augmented reality" and "augmented virtuality".

A number of issues arise when attempting to balance the needs for a close correlation between real and virtual objects, maintenance in real-time, and acceptable processing burden. When "dressing" real-world, three dimensional (3D) structures with virtual objects, the scale of the 3D structure can mean that any detailed model used to represent the structure when generating and applying the virtual objects may require significant levels of computation power, potentially degrading the ability to reproduce and maintain the virtual object in real-time.

The generation of suitable models of 3D structures as an environment in which virtual content is applied can be performed in advance of the reproduction of the virtual content by a user device such as a smartphone or wearable device.

One approach to 3D modelling relies on the processing of large sets of images (ranging from sets of the order of thousands of images to large-scale data sets having tens of millions of images) all related to a particular environment, architectural or natural structure or location. The constituent images may be collated from images captured by a plurality of devices (such as consumer smartphones and digital cameras). Such "crowdsourced" image data sets may vary greatly in terms of appearance and quality and are not likely to be synchronized with other such images.

Other image data sets may be collected by harnessing the image capture facilities of dedicated image capture devices (e.g., digital cameras and unmanned aerial vehicle (UAV)-borne image capture equipment), which in principle provides greater consistency and control over the resulting data set.

In each case, the captured images are stored, typically uploaded to distributed storage devices, for future redistribution and/or processing (e.g. stored on a cloud-based storage facility).

The task facing the modeler is to recover the 3D geometry and appearance of the 3D scene from 2D photographs/videos captured from multiple viewpoints. A first step is often to gather together images according to associated data—a geolocation in metadata or an image title indicating the target of the image, for instance. Associated images may then be processed to extract 3D points that may be used to anchor spatial relationships with other images from other camera poses. Clearly, the use of dedicated image capture devices at known locations, poses, etc. allows the modeler to construct a data asset with easily discovered data associations.

In a technique known as Structure from Motion (SfM), associated images (i.e. plural two-dimensional images of a collection of 3D points, assumed to be static 3D points, from different perspectives) are processed to generate a 3D geometry having the greatest probability of being a match to the data in each of the images. The resulting 3D geometry may be represented as a 3D point cloud (or "sparse 3D model") or a 3D polygon mesh of vertices.

A point cloud is a set of data points in a coordinate system. The coordinate system may for example be a Cartesian coordinate system (i.e. (x,y,z)-coordinates), a cylindrical coordinate system or a spherical coordinate system.

Examples of SfM techniques include the generation of descriptors for certain features of the images in the data set (BRIEF) and the application of corner detection (ORB).

Filtering processes may be used to remove portions of the point cloud corresponding to moving or dynamic surfaces and to points that provide limited information (e.g. redundant points within a flat surface). In addition to the use of 3D point cloud data, some embodiments may also use additional types of environment data Each vertex in the 3D mesh (or point in the point cloud representing the 3D geometry) may by mapped (by a mapping) to respective texture data at texture coordinates in a texture map. The mapping is sometimes referred to as a "UV mapping", so-called because the coordinates in the texture map are conventionally referred to as "u" and "v".

Registration of the device in an environment for which a suitable model has been prepared may comprise using satellite-based global positioning systems (e.g. GPS) or other location-based systems to identify an initial rough location estimate. Map databases may then be looked up to determine whether a suitable 3D model is already available for a 3D structure or environment at the particular location identified by the identified rough location estimate.

In the absence of a ready-prepared 3D model of a real-world object or environment, the device may construct its own model (i.e. 3D mesh and UV mapping from that mesh to an unpopulated texture map) from one or more images captured by an image capture module of the device.

When a user moves a capture device relative to real spaces/environments and/or stationary objects, it becomes necessary to refresh virtual content based on the new position of the device. However, the virtual content may not be displayed correctly if the spatial position (i.e. pose) of the device is not tracked accurately. Effective reproduction of virtual content together with real-time, captured video images, therefore, relies upon accurate tracking of the location/orientation of the capture device (i.e. the position of the augmented reality device in space) and near real-time updating of the virtual content. Where augmented reality scenes include both real objects and virtual objects, this requires a tracking that is set and maintained between the real objects and the virtual objects. This tracking is important to maintaining an immersive presentation of the virtual objects within the environment and treating the virtual objects as if they were real within the environment. Failed tracking creates jitter or unexpected movement of the virtual object (s) within a scene, or may set an initial virtual object placement that overlaps or is out of synchronization with real objects in unnatural ways.

One way of tracking the actual location of a device is to start with a highly accurate model of an environment, and to compare the model with image data from a device, frame by frame. Examples of suitable models include the three-dimensional (3D) point cloud model and 3D polygon mesh models discussed above.

Simultaneous location and mapping (SLAM) systems are systems that are used to track key points in two-dimensional image frames of video, and to identify three-dimensional objects from the image frames as well as a relative location of the camera to those objects. Such processing to identify three-dimensional objects, however, is processor and memory intensive.

Rather than using a dense point cloud of complex environment surfaces, embodiments described herein may use compressed or simplified point cloud models of an environment. Such simplified 3D point cloud models may include sets of key point data that follow building edges, environment edges, and surfaces that are stable over time and that present an easily identifiable section in an image. Path edges with high color contrast compared to adjacent surfaces and other fixed objects may be represented in such a simplified point cloud, while typically dynamic objects such as tree branches with leaves or flags may be excluded.

Increasingly, user devices such as smartphones and wearable devices are also provided with one or more inertial measurement unit (IMU) sensors that monitor the orientation and direction of the device (e.g. accelerometers, gyroscopes, etc.). The information from such IMU sensors may be used in conjunction with visual tracking techniques (such as SLAM) to enhance the accuracy of the tracking of the user device in relation to the real objects in the surrounding environment.

Drawings

FIG. 1A is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). One or more client companion devices 114 (e.g., wearable devices) may be communicatively connected to one or more of the client devices 102.

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, augmented reality data, media annotation and overlays, message content persistence conditions, social network information, and live event information, as examples. Data exchanges within the messaging system 100 are invoked and controlled through functions available via user interfaces (UIs) of the messaging client application 104. Examples of augmented reality data that may be exchanged using the messaging client application 104 include 3D geometry information corresponding to real and virtual objects.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Figure 1B:
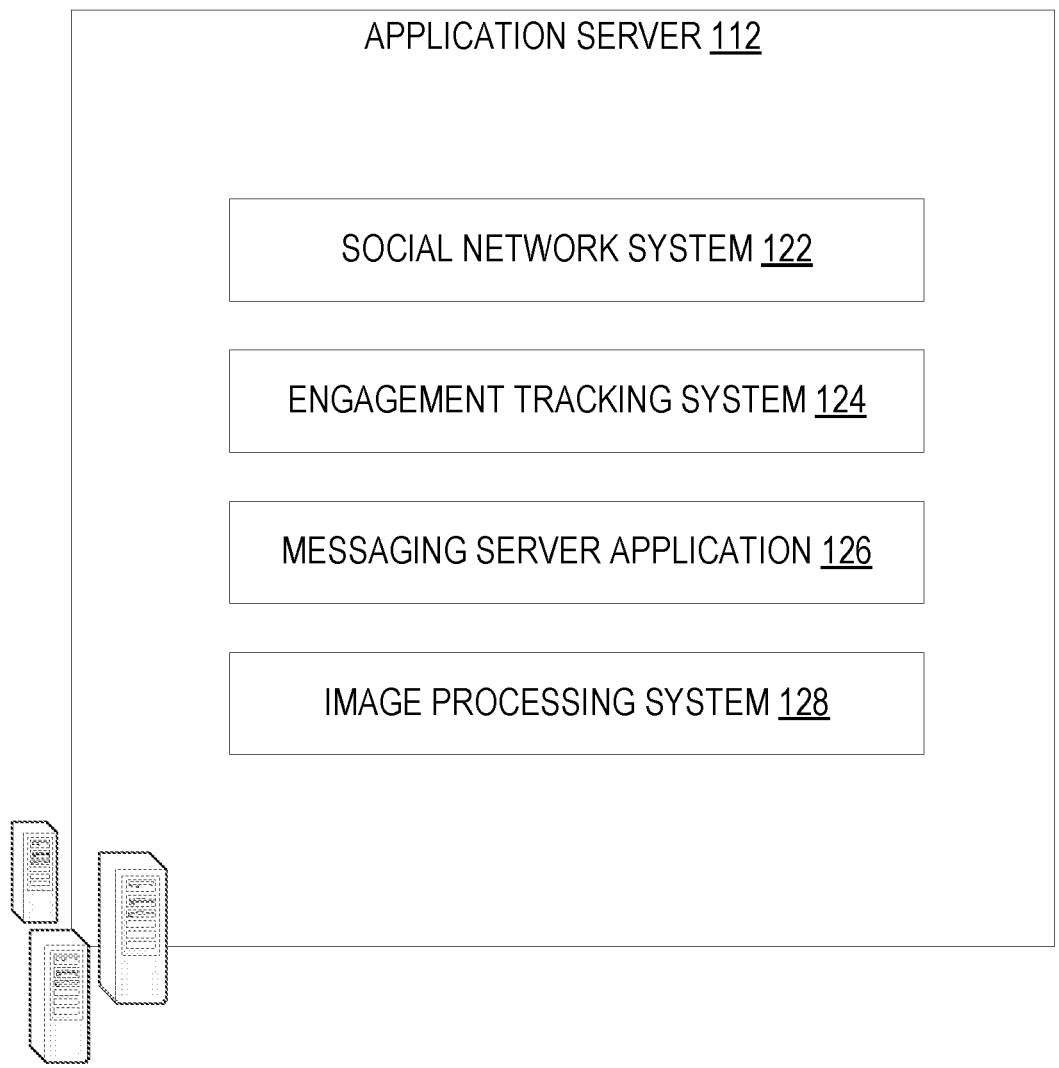
FIG. 1B is a block diagram showing further details of certain applications and subsystems hosted in an application server, such as the application server in FIG. 1A.

As shown in FIG. 1B, the application server 112 hosts a number of applications and subsystems, including a social network system 122, an engagement tracking system 124, a messaging server application 126, an image processing system 128, and an augmented reality system 162.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 126, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The messaging server application 126 implements a number of message processing technologies and functions, particularly related to the aggregation and other processing of content (e.g., textual and multimedia content) included in messages received from multiple instances of the messaging client application 104. The text and media content from multiple sources may be aggregated into collections of content (the collections may be referred to as "stories" or "galleries", depending upon context and/or content type). These collections are then made available, by the messaging server application 126, to the messaging client application 104. Other processor and memory intensive processing of data may also be performed server-side by the messaging server application 126, in view of the hardware requirements for such processing.

The application server 112 also includes an image processing system 128 that is dedicated to performing various image processing operations, typically with respect to images or video received within the payload of a message at the messaging server application 126. Examples of image processing operations include the upscaling or downscaling of the image data for presentation on a display of a receiving device and the transcoding of the image data for interoperability or compression. The image processing operations may compensate for the differing properties of the individual users' cameras (e.g. exposure) when virtual image content is shared between user devices providing a 'canonical' texture for an imaged object. In other instances involving the shared presentation of the same virtual content in different user devices, the virtual content deriving from captured image data from more than one user device, the image processing system 128 may operate to resolve competing views of the same patches of the building—if user A and user B can both see a patch then the server could average their views (after compensating for camera properties), or perhaps reject one of the views, according to an image processing policy.

The social network system 122 supports various social networking functions services, and makes these functions and services available to the messaging server application 126.

The application server 112 is communicatively coupled to a database server 118, which facilitates access to a database 120 in which is stored data associated with messages processed by the messaging server application 126.

Figure 2:
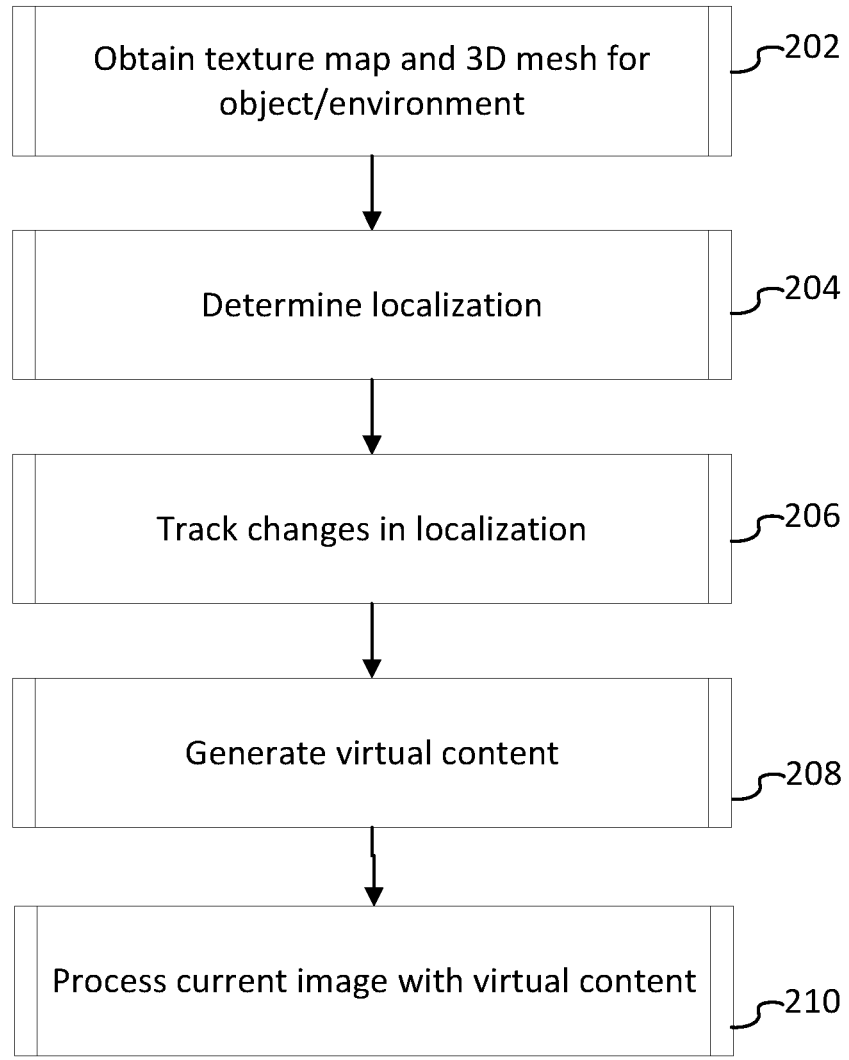
FIG. 2 is a schematic diagram illustrating certain operations of a client device according to example embodiments.

The schematic diagram in FIG. 2 shows certain functional blocks illustrating the operation of a client device, according to certain example embodiments.

The client device includes at least one processor and the processor operates to access a UV mapping and a 3D mesh corresponding to a real-world object or environment, operation 202. This may comprise retrieving texture map and a 3D mesh (collectively representing a 3D geometry) from storage means (such as database 120 in communicative connection with application server 112). Alternatively or additionally, the texture map and 3D mesh may be received from a further client device. In certain embodiments, the texture map and 3D mesh may be generated by the client device itself.

Figure 3:
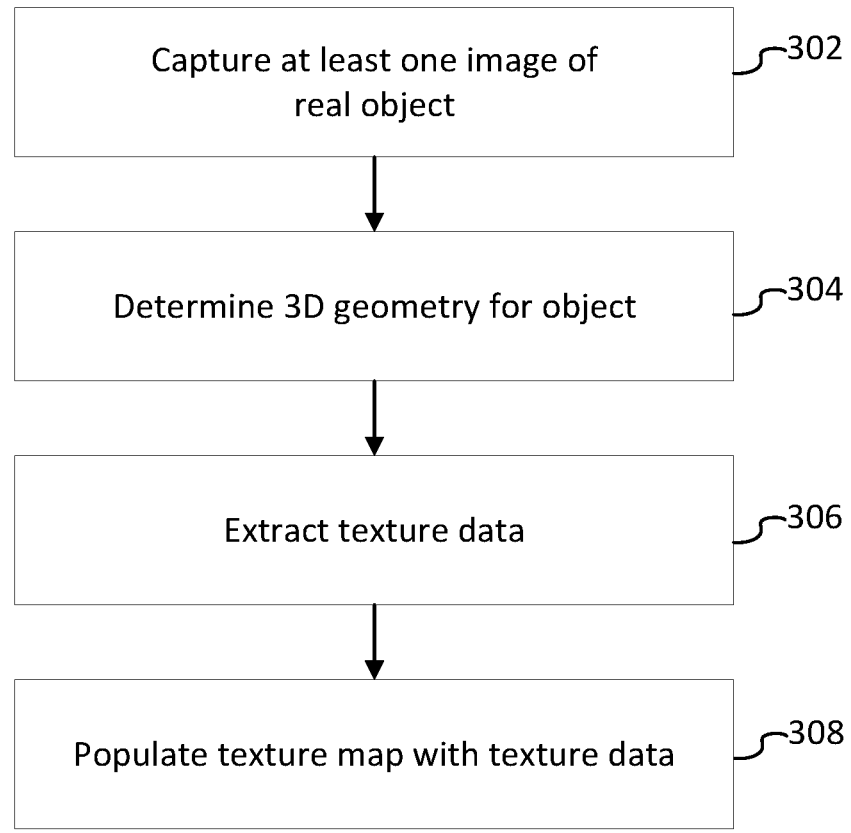
FIG. 3 is a schematic diagram illustrating an exemplary technique for generating a texture map and 3D mesh at a client device according to certain example embodiments.

In cases where the texture map and 3D mesh are generated by the client device, this operation may be achieved using the technique illustrated in FIG. 3.

In certain example embodiments, the processor may determine the localization of the device relative to the real-world object or environment, operation 204. This initial localization may be used to narrow the scope of the texture map and 3D mesh that the client device needs to access. Examples of techniques for determining an initial localization may include localization of the device by a positioning system of the device (for instance, a positioning hardware module coupled to a storage medium and the at least one processor of the device, the positioning module may be a global positioning system (GPS) module). Alternatively, the user may input a localization directly: for example, inputting a unique identifier (e.g., "Houses of Parliament"), a postal address, grid location in a geographic map or a latitude-longitude pair. In a further alternative, the real-world object or environment may be associated with: an information panel provided with text, signage, a 1-D and/or 2-D barcode data; a radio-frequency identifier (RFID); a near-field communication (NFC) tag; or the like, that the client device may read to determine the localization.

Having determined the initial localization and accessed the texture map and 3D mesh, the processor may execute an operation to track changes in localization of the device relative to the initial localization (and thus, relative to the 3D mesh corresponding to a real-world object or environment). Examples of techniques for tracking changes in localization include the SLAM and IMU techniques mentioned above.

In certain example embodiments, the processor may be placed in a creative mode, during which a user may interact with the client device to introduce a transformation input. The transformation input may, for example, be a user gesture input into the device. The input gesture may be a touch-screen input gesture or a detected change in orientation in an input device while the input device is operated in a gesture input mode. In the latter case, the input device may be embedded within the client device so that changes in orientation and position of the client device tracked by the tracking techniques above may also be used as input gestures.

The processor of the device may, in certain embodiments, generate virtual content by applying a transformation corresponding to the transformation input to the 3D mesh, operation 208. The transformation here maps a plurality of vertices of the 3D mesh to a plurality of transformed vertices in a transformed geometry. The transformed vertices are then populated with texture data according to the mapping and texture data in the texture map.

Finally, at least one current image of the real-world object, captured by an image sensor of the device, may be processed, operation 210, to superpose a view of the virtual content over the current image.

Examples of techniques for superposing virtual content upon images of real-world objects include buffering pixels for each frame of a capture real-world image and replacing selected pixels in each frame by corresponding pixels depicting the virtual content and then presenting the augmented buffered pixels for display. In a further example, suitable for wearable client devices such as smart glasses, the virtual content is presented in an otherwise transparent display layer via a display module of the wearable device.

FIG. 3 illustrates an exemplary technique for generating a texture map and 3D mesh at a client device.

Under the control of a processor of the device, an image sensor of the device is controlled to capture (i.e. photograph) at least one image of a real-world object, operation 302

The processor then determines a 3D geometry corresponding to the real-world object based on the at least one captured image using a conventional photogrammetric technique, operation 304.

The processor then processes the at least one image to extract texture data for respective patches of the object, operation 306.

Finally, a UV mapping is defined from the 3D geometry to a data structure in UV space. In certain embodiments, the data structure is at least partially populated with the extracted texture data, operation 308. The 3D mesh comprises a 3D representation of the respective vertices in the real-world object. The populated data structure is maintained as a texture map.

Figure 4:
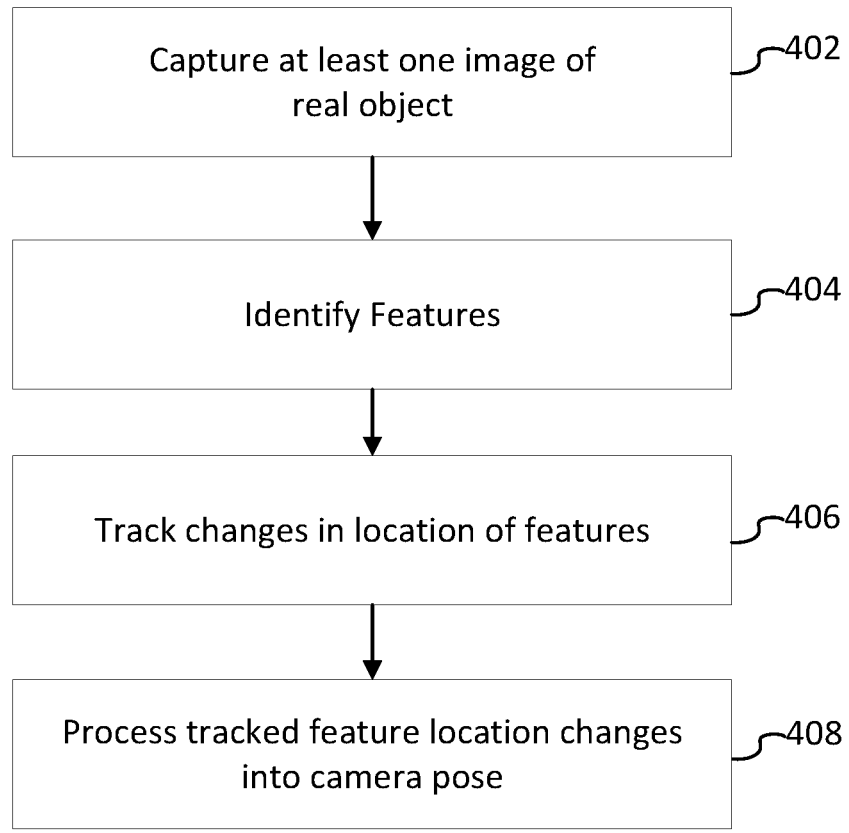
FIG. 4 is a schematic diagram illustrating an exemplary technique for tracking changes in localization of a client device.

FIG. 4 illustrates an exemplary technique for tracking changes in localization of a client device. At operation 402, the client device is configured to control an image capture module to capture at least one current image of the real-world object. The at least one current image is processed to identify features (for example straight edges, patches of lighter-than- (or darker-than-)surrounding pixels, etc.), operation 404.

Changes in the location and orientation (in the or each two-dimensional current image) of the identified features are tracked (i.e. measured and stored), operation 406.

The tracked changes in the location and orientation of the identified features are then processed, operation 408, to derive a camera pose (in three dimensions) that, when projected onto a two-dimensional plane best matches the changes in location and orientation of the identified features. Examples of techniques for deriving a camera pose from tracked positions of features identified in captured images include the University of Oxford's PTAM (Parallel Tracking and Mapping) camera tracking system (http://www.robots.ox.ac.uk/~gk/PTAM/), the FAST corner detection technique (https://www.edwardrosten.com/work/fast.html), SIFT and Ferns (both techniques reviewed in "Pose Tracking from Natural Features on Mobile Phones" by Wagner, D. et al. https://data.icg.tugraz/at/~dieter/publications/Schmalstieg_142.pdf), the contents of which are each incorporated by reference herein.

Figure 5:
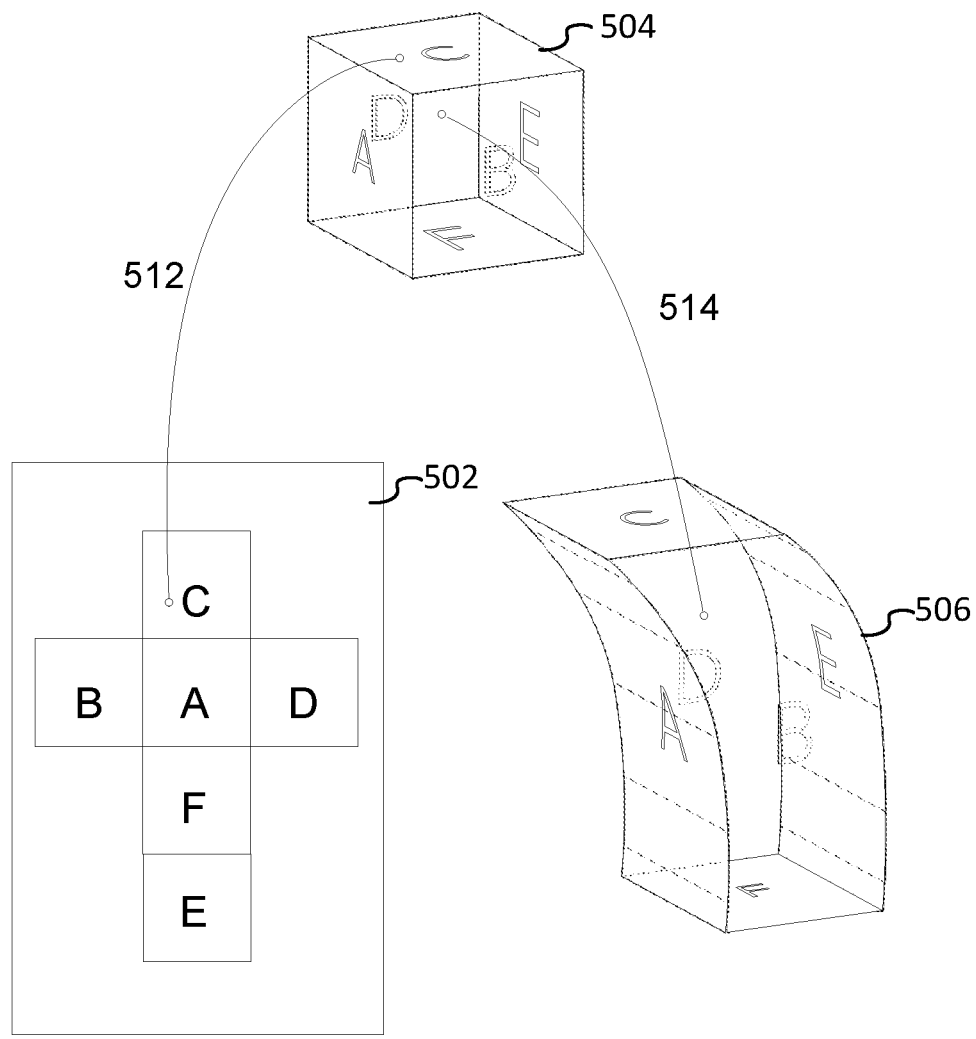
FIG. 5 illustrates the application of a transformation on a 3D mesh in accordance with certain example embodiments.

FIG. 5 illustrates the application of a transformation on a 3D mesh in accordance with certain example embodiments.

A 3D geometry (corresponding to a real-world object) is represented as a 3D mesh 504 and a corresponding texture map 502. The 3D geometry in FIG. 5 corresponds to a real-world object in the shape of a cube. The cube-shape is used for illustrative purposes only, with no loss of generality: while real-world objects are typically more complex than cubes, the underlying principal illustrated in this Figure remains unchanged.

FIG. 5 shows how any given point on the 3D mesh 504 maps to a corresponding coordinate in the texture map 502. The mapping 512 between 3D mesh 504 and texture map 502 is conventionally referred to as a UV mapping.

When a transformation (here, for example a deformation) is applied to the vertices in the 3D mesh, the resulting 3D geometry is represented as transformed (i.e. deformed) 3D mesh 506. In transformation mapping 514, each point on the deformed 3D mesh 506 maps to a point on the undeformed mesh 504 (and thus indirectly to a coordinate in the texture map 502).

Figure 6A:
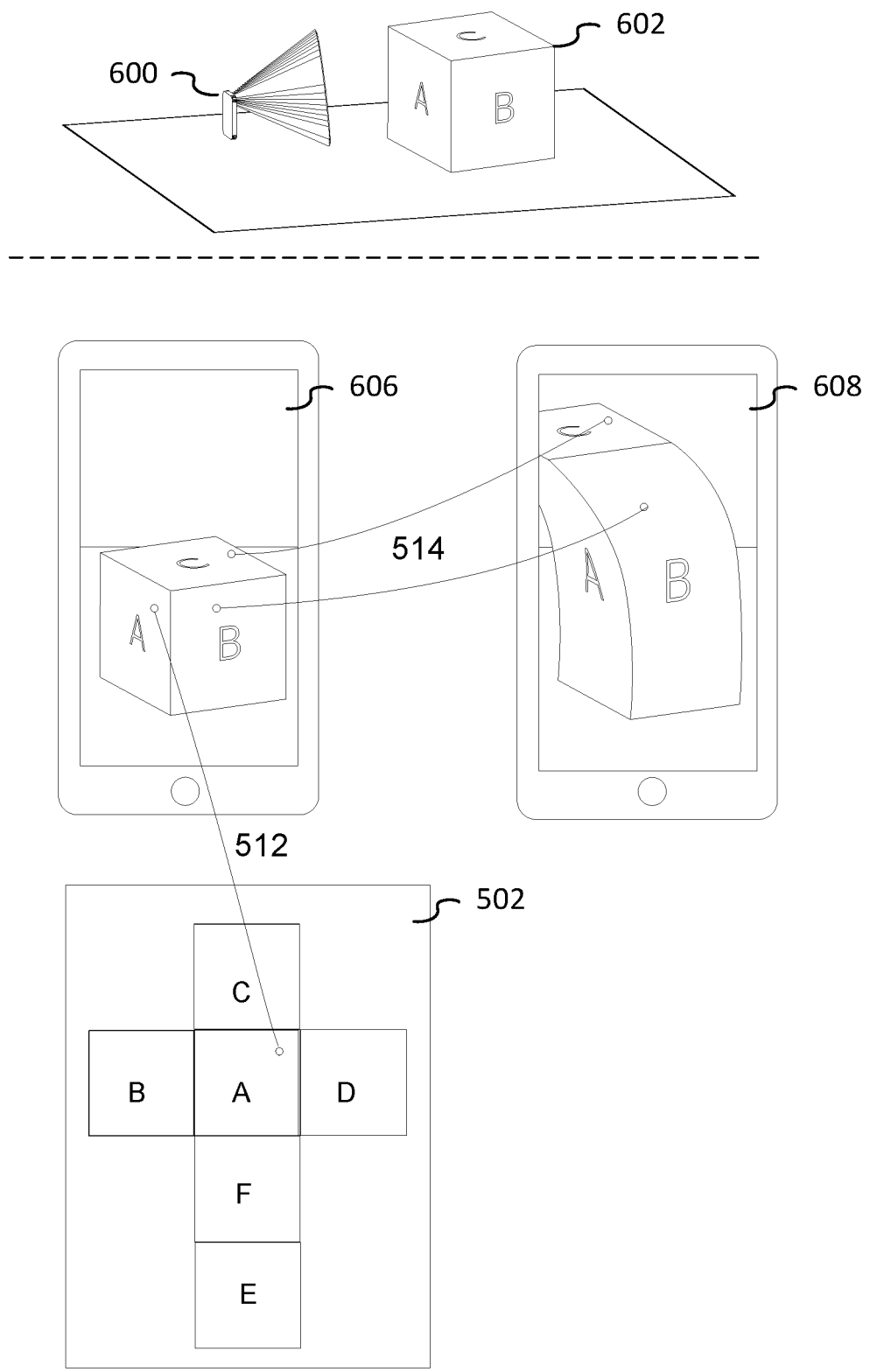
FIGS. 6A and 6B illustrate the display of captured image views and augmented image views in a device in accordance with certain example embodiments.

FIG. 6A illustrates the relationship between a real-world object 602, the feed of captured images of that object displayed in a client device 600 and an augmented image displayed in that device in accordance with certain example embodiments.

By accessing (or constructing) a 3D mesh and texture map corresponding to the real-world object (as shown in FIG. 5), the client device can take the current image of the real-world object and generate a transformed, virtual object. The transformation operates on the 3D mesh model derived from the real-world object and, since any given point on the 3D mesh maps to a corresponding coordinate in the texture map 502 (i.e. according to UV mapping 512), a further mapping (i.e. transformation mapping 514) from the unchanged 3D mesh 504 to the transformed 3D mesh 506 effectively permits texture data from the texture map to be mapped onto the transformed 3D mesh 506.

The client device may present different screen-views. In FIG. 6A, these screen-views are represented as displayed screens on a smartphone. A camera image view 606 displays the currently captured video image of the real-world object from the perspective of an integral digital camera. A corresponding texture map 502 includes texture data extracted from visible and unoccluded points of the real-world object (i.e. sides A, B and C of the imaged object).

The texture map 502 may also include pre-existing texture data for some or all points of the object that are currently out of the field of view of the smartphone camera (i.e. sides D, E and F of the imaged object). For objects with permanent foundations in the surrounding environment (such as buildings, bridges etc.), it may safely be assumed that certain aspects of the object are permanently out of view. In certain embodiments, the pre-existing texture data for some or all points of the object may be supplied by reference to a shared texture map for the real-world object and/or the texture map of a second client device having a different perspective upon the object. Pre-existing texture data for some or all points of the object may be accessed from other client devices and/or shared storage servers via the operation of a messaging system such as that illustrated in FIG. 1A.

The client device in FIG. 6A may also present an augmented reality image view 608. Here, the client device displays a virtual view of the transformed 3D mesh 506 and, for each point on the transformed 3D mesh 506 that is in the virtual view, fetches texture data from the texture map 502 according to the UV mapping 512 to points on the original 3D mesh and the transformation mapping 514 from the original points to points in the transformed 3D mesh. It is noted that due to the transformation, counterparts to certain points of the object visible in the camera view are no longer visible in the virtual view.

In certain embodiments, where the original point on the building that corresponds to a deformed point is visible and unoccluded in the current camera feed, the texture data for those visible points may be read directly from the camera feed. Thus, in FIG. 6A, texture data for faces A, B and C are available directly from the camera feed as faces A, B and C are all visible. This provides a more accurate perceived match to the real-world object and a resulting higher quality user experience.

To safeguard against future changes in camera angle and position, the texture data for all points of the object in the currently capture video frame are cached in the texture map 502. Texture data for visible and unoccluded points replaces any pre-existing texture data in the texture map 502.

In certain example embodiments, the replacement of pre-existing texture data is performed gradually in a weighted blending fashion. The accuracy of the pre-existing texture data is thus improved by merging that data with newly captured texture data, so that every pixel in the texture map (or shared texture map) essentially converges over time to a resulting texture data that represents the consensus data for that pixel, given enough views. For each successive frame, the current camera image is assigned a tracking reliability value and this value is then used to weight the blending. For example, frames where the camera is moving a great deal (e.g. detected using IMU sensors such as integrated gyroscope and/or accelerometer) and thus the image can be expected to include a higher level of motion blur than it would at rest are given lower tracking reliability values (as the tracking is likely to be less accurate) and pixels from such frames are given less weight as a result.

Figure 6B:
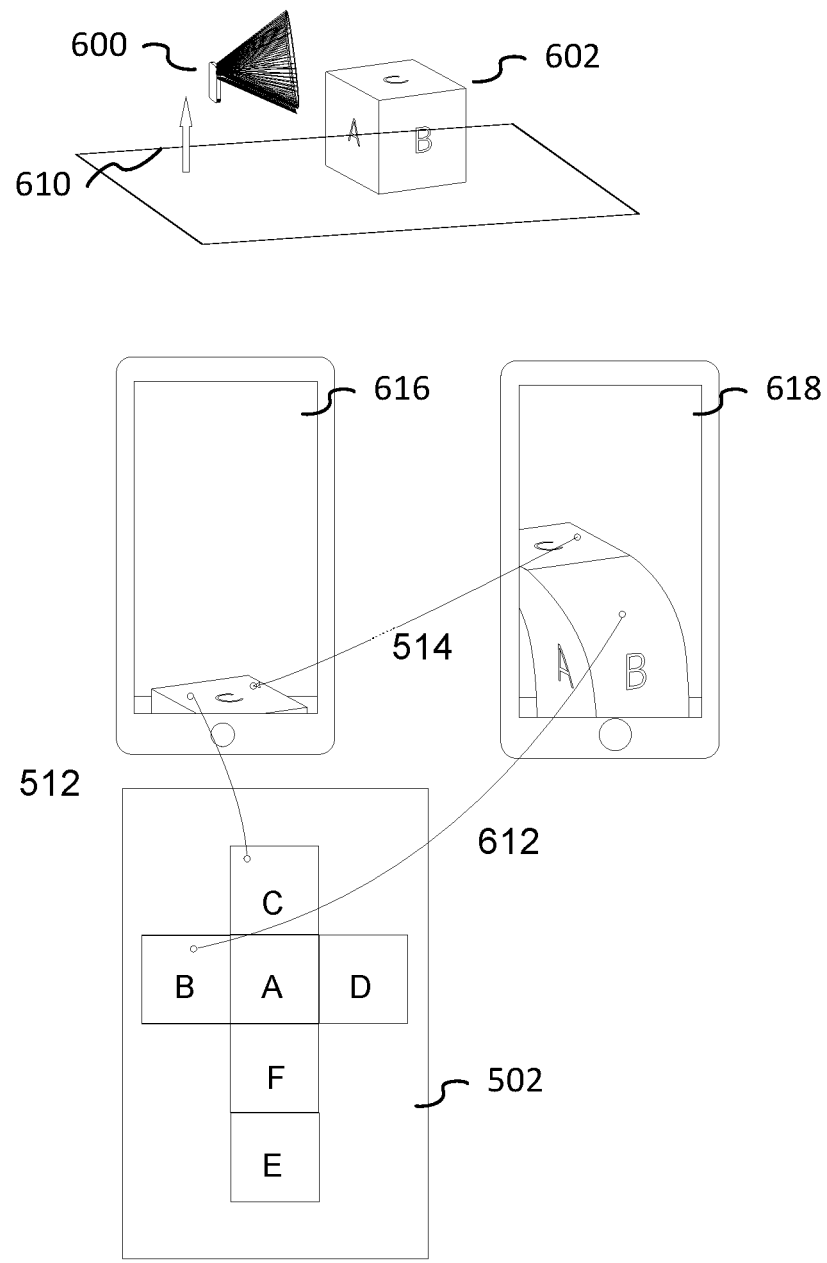

FIG. 6B provides a further illustration of the relationship between a real-world object 602, the feed of captured images of that object displayed in a client device 600 and an augmented image displayed in that device in accordance with certain example embodiments.

FIG. 6B illustrates the result of a change 610 in the perspective of the client device from the camera position in which sides A and B are in view to a camera image view 616 where a more limited view of the real-world object (predominantly side C) is available from the perspective of the integral digital camera of the client device 600. Changes in localization and orientation of the client device may be tracked by any of the tracking techniques discussed above.

In this case, the texture data for sides A and B in the texture map 502 may also include texture data cached from previous frames of captured video—captured before the points of the object on sides A and B passed out of the field of view of the smartphone camera.

As a result, the client device 600 in FIG. 6B may also present an augmented reality image view 618. In augmented reality image view 618, the client device displays a virtual view of the transformed 3D mesh 506. As in FIG. 6A, the processor of the client device 600 fetches texture data from the texture map 502 according to the transformation mapping 514 between points on the original 3D mesh 504 and points in the transformed 3D mesh 506, for each point on the transformed 3D mesh 506 that is in the virtual view. In this case, however, certain points of the object are no longer visible in the camera view but counterparts to those points are still visible in the virtual view. The generation of the virtual view includes accessing texture data for points visible in both current camera image view 616 and augmented reality image view 618 directly from the current camera view data and accessing texture data for points visible only in the augmented reality image view 618 by referring to the cached texture data at a corresponding point in the texture map 502. The latter path relies upon the application of both the UV mapping and then the transformation mapping to supply the u,v-coordinate for the texture data for points visible only in the augmented reality image view 618.

While the transformation illustrated in FIGS. 5, 6A and 6B is a uniform deformation of vertical lines into skewed curved lines, the transformation may take many other, often more complicated, forms. Examples of other transformations include replications (in which blocks of the original 3D mesh are replicated at more than one location in the virtual content space and the texture data from the texture map is mapped to vertices in each of the replicated blocks), reflections (in which part or all of the vertices in a 3D mesh are mirrored) and translations (in which part or all of an original 3D mesh is mapped to an undistorted 3D mesh at a spatial offset in virtual content space from the location of the original real-world object). Reflection-type transformations may be used to ensure that signage in the virtual content space remains human-readable while the surrounding virtual content is mirror-reflected.

Caching of texture data is important because it facilitates population of virtual content without requiring heavy use of computational capacity.

In certain embodiments, a dynamic texture map is maintained as a texture cache. The texture map corresponds to a projection of the vertices in a 3D polygonal mesh of a building or other real-world object or environment. The mapping between 3D mesh and texture map might alternatively be referred to as a "UV mapping" as the vertices in the 3D mesh (represented by Cartesian coordinates $\{x, y, z\}$) are projected to a two-dimensional map with coordinates $\{u,v\}$. The texture cache may be initialized with default texture data, for example, RGBA (0, 0, 0, 0).

As the image capture module of the client device captures frames of video data, the device stores what has been seen by the camera in the current frame at respective pixels of the texture cache.

To perform the caching for a single frame, a 3D mesh that corresponds to the real-world object being imaged is accessed. The 3D mesh is first mapped (i.e. rendered) to the texture cache in UV space (i.e. a UV mapping is generated). For every pixel of the 3D mesh in UV space, the corresponding world position is calculated and then the corresponding coordinates in the current camera image are calculated.

To determine whether the texture data for any given pixel of the 3D mesh in UV space is to be cached (at a corresponding u,v-coordinate), it is determined whether that pixel corresponds to coordinates that are outside of the camera frame. If the coordinates do lie outside of the camera frame there will be no camera image texture data to cache, so these pixels are not cached.

Equally, it is determined whether the surface on which any given pixel of the 3D mesh lies is behind another surface of the 3D mesh from the camera's point of view. If the surface is determined to be behind (i.e. occluded by) another surface, the corresponding camera image pixel will not be the correct surface and again pixels on that occluded surface are not cached.

Determining whether a surface is occluded by another surface may be achieved by first rendering, with depth-buffering, the view-space depths of the original 3D mesh and then checking whether the calculated depth of the pixel in that 3D mesh is equal to the rendered depth (and thus that pixel is indeed on the closest surface to the camera).

If the candidate cached pixel is valid (i.e. within camera frame and one closest surface) then texture data for that pixel is cached in the texture map. In certain embodiments, the texture data may simply replace pre-existing texture data currently stored for that u,v-coordinate. In other embodiments, the texture data may be merged with pre-existing texture data with a low opacity for temporal smoothing. The alpha channel in the RGBA representation of texture data may thus represent how much caching has been done for that pixel.

In many implementations, the image capture devices (e.g. digital cameras integrated in users' smartphones) frequently change their exposure settings depending on the current target image. In certain embodiments, whenever a pixel from the current frame of a given camera image is to be stored in the cache texture/texture map, an exposure compensation function is applied to normalise the current camera exposure before the normalized value is written to storage. As a result, the stored pixel has a color value that has been effectively normalized in brightness. Whenever a pixel is to be retrieved (i.e. the texture data to be read) from the cache texture/texture map, an inverse exposure compensation function is applied to the normalized value in order to match the current camera exposure.

Examples of virtual content effects using the transformation technique described herein include effects in which a mirror image or duplicate of a real-world building may be erected in virtual space and displayed beside the real-world object in an augmented reality screen view.

Figure 7A:
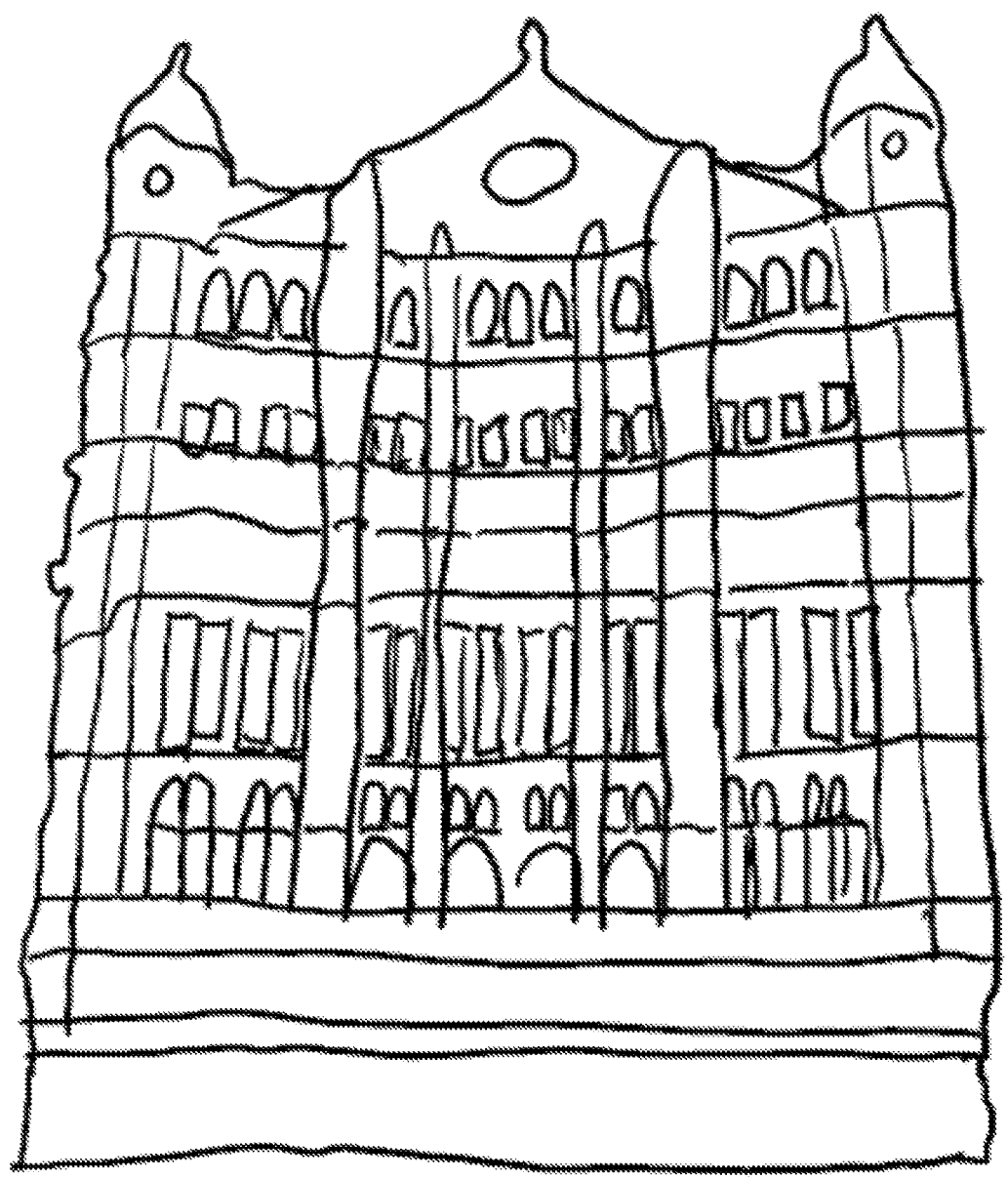
FIGS. 7A and 7B illustrate a transformation effect in accordance with certain embodiments of the present invention.
Figure 7B:
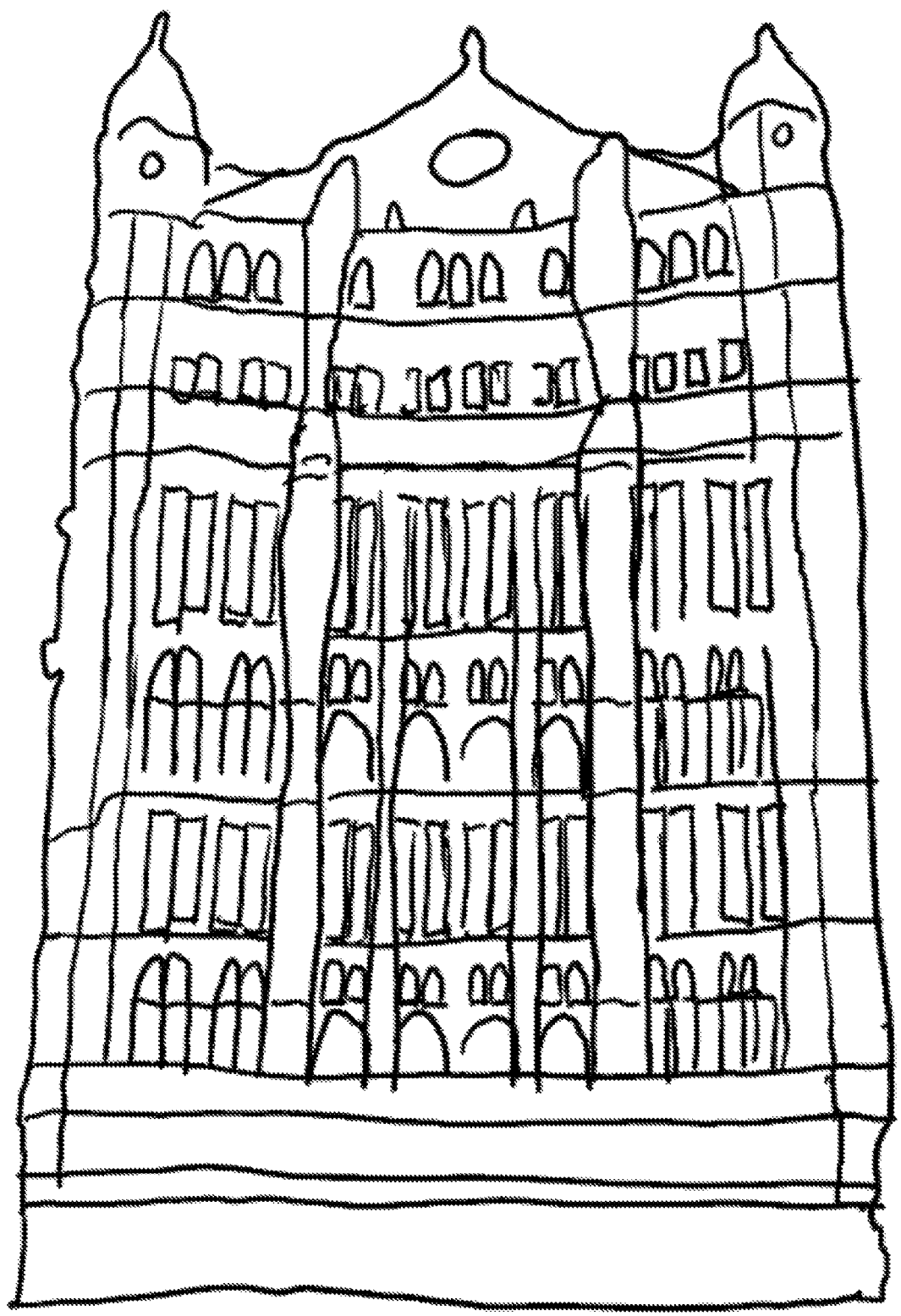

The transformation technique of the present disclosure may be used to mock-up a cityscape, adding additional levels to apartment blocks and/or replicating existing and placing additional buildings in a virtual view. FIGS. 7A and 7B illustrate a transformation effect in which a new level is inserted in an augmented reality view of a building in accordance with certain embodiments of the present invention. Whereas the camera image view in FIG. 7A shows a building with four rows of windows, the augmented reality screen view in FIG. 7B shows a building with six rows, the lower levels with two rows of windows being duplicated and "inserted" between the existing levels.

Figure 8A:
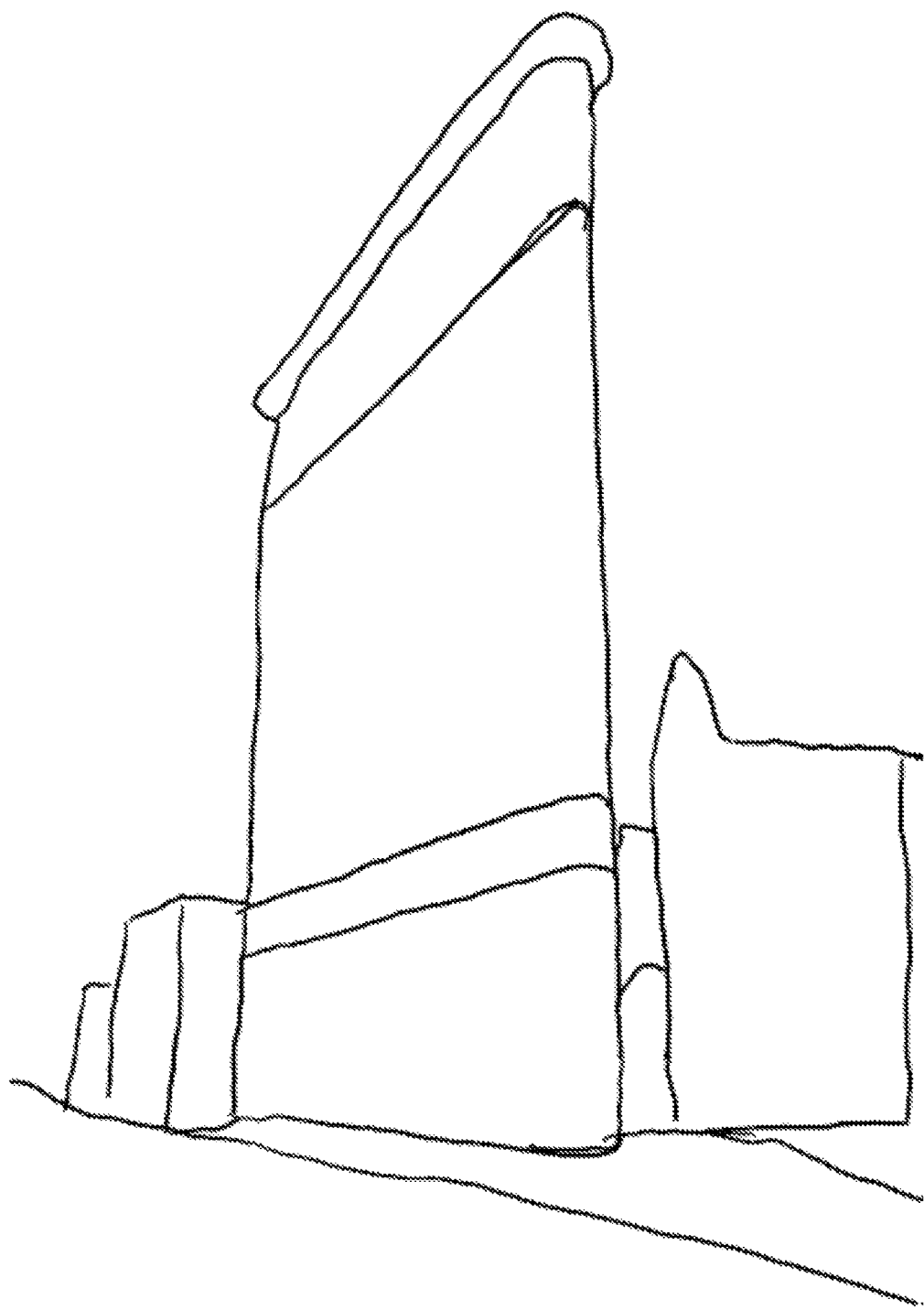
FIGS. 8A and 8B illustrate a transformation effect in accordance with other embodiments of the present invention.
Figure 8B:

The transformation technique of the present disclosure may also be used to pass information between two devices. With a first client device receiving creative input that defines a transformation to be applied to a view of a real-world object (for example, entering text or image information by gesture, touch input or keyboard entry) and generating virtual content that may be shared with another user in a different position relative to the real-world object. FIGS. 8A and 8B illustrate the application of the transformation in accordance with certain embodiments of the present invention to messaging. FIG. 8A shows a camera image view of a building. FIG. 8B illustrates an augmented reality screen-view of the same building with a message "I ♥ N Y" constructed by mapping elements of the fabric of the imaged building to provide the "structure" of the characters in the message.

Software Architecture

Figure 9:
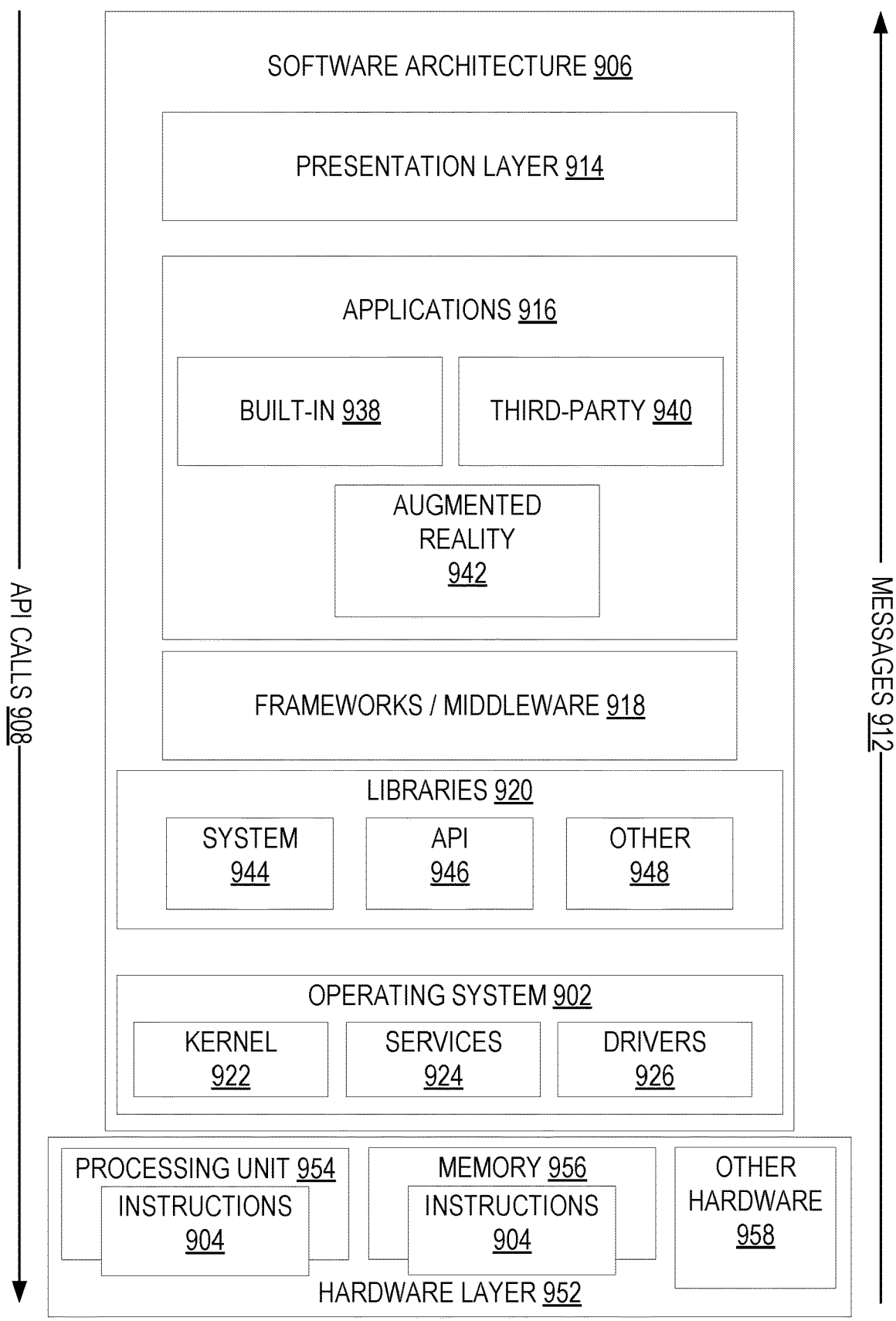
FIG. 9 is a block diagram illustrating a representative software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 can be installed on any one or more of the client devices 102 described above.

Figure 10:
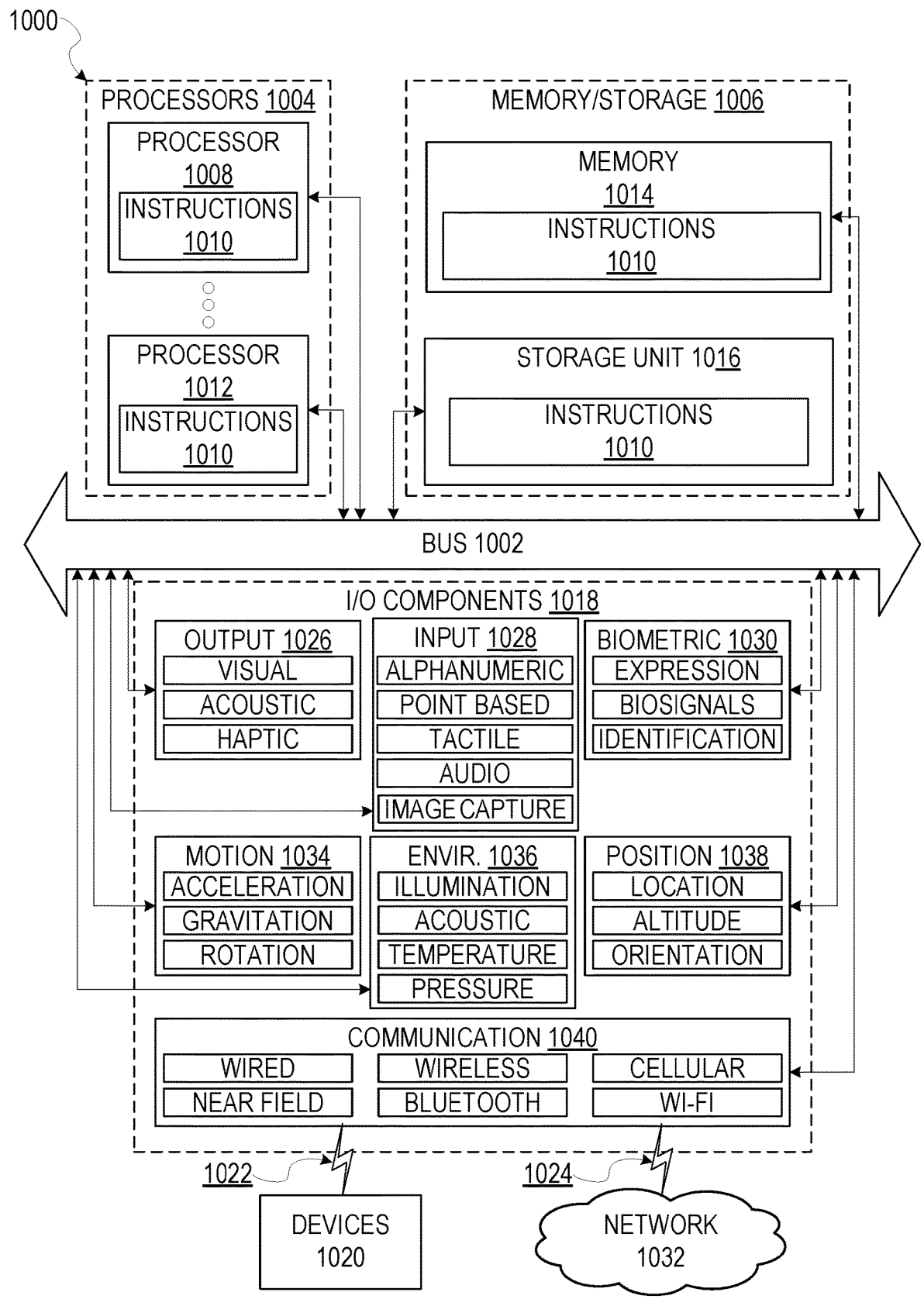
FIG. 10 is a block diagram illustrating components of a machine, according to some example embodiments, able to read instructions from a machine-readable medium (e.g., a machine-readable storage medium) and perform any one or more of the methodologies discussed herein.

A representative hardware layer 952 is illustrated and can represent the hardware of a client device such as that illustrated in FIG. 1A. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958. A more detailed diagram of a non-limiting example of a machine 1000 implementing the hardware layer is shown in FIG. 10: that machine includes, among other things, processors 1004, memory 1014, and I/O components 1018.

In the example architecture of FIG. 9, the software architecture 906 may be conceptualized as a stack of layers where each layer provides particular functionality. For example, the software architecture 906 may include layers such as an operating system 902, libraries 920 (i.e. a data layer), applications 916 (i.e. an application layer) and a presentation layer 914. Operationally, the applications 916 and/or other components within the layers may invoke application programming interface (API) API calls 908 through the software stack and receive a response as in response to the API calls 908 (i.e. an interface layer). The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, inertial measurement unit (IMU) drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein. The applications 916 may include an augmented reality client application 942.

The augmented reality application 942 may implement any system or method described herein, including accessing map information, processing image and point cloud data and feature matching, or any other operation described herein. Further, in some embodiments, a messaging application and the augmented reality application 942 may operate together as part of an ephemeral messaging application. Such an ephemeral messaging application may operate to generate images, allow users to add augmented reality elements to the images, and communicate some or all of the images and/or augmented reality data to another system user. After a deletion trigger has been met, the sent data is communicated from the receiving user's system, and may also be synchronized to delete the images and/or augmented reality data from any server involved in communication of the ephemeral message that included the image and/or the augmented reality data. In some embodiments, the trigger for deletion of data from a receiving user's device may be a timer that indicates how long an augmented reality image is displayed for. In other embodiments, the ephemeral messaging system may have set date and time triggers for deletion, or deletion associated with a number of times that a receiving user has accessed the data.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. The input components 1028 may also include one or more image-capturing devices, such as a digital camera for generating digital images and/or video.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

The instructions 1010 can be transmitted or received over the network 1032 using a transmission medium via a network interface device (e.g., a network interface component included in the communication components 1064) and utilizing any one of a number of well-known transfer protocols (e.g., HTTP). Similarly, the instructions 1010 can be transmitted or received using a transmission medium via the coupling 1022 (e.g., a peer-to-peer coupling) to devices 1020. The term "transmission medium" shall be taken to include any intangible medium that is capable of storing, encoding, or carrying the instructions 1010 for execution by the machine 1000, and includes digital or analog communications signals (i.e., carrier signals) or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

It should also be noted that the present disclosure can also take configurations in accordance with the following numbered clauses:

Clause 1. A computer-implemented method for displaying virtual content in a client device comprising, at a processor of the device: accessing a texture map and a 3D mesh corresponding to a real-world object or environment; determining localization of the device relative to the real-world object or environment; tracking changes in localization of the device; in a creative mode, receiving a transformation input; generating virtual content by applying a transformation corresponding to the transformation input to the 3D mesh, the transformation mapping a plurality of vertices of the 3D mesh to a plurality of transformed vertices in a transformed geometry and populating the transformed vertices with texture data according to the mapping and the texture map; and processing at least one current image of the real-world object, captured by an image sensor of the device, to superpose a view of the virtual content over the current image.

Clause 2. The method of clause 1, wherein accessing a texture map and 3D mesh comprises: capturing, by an image sensor of the device, at least one image of a real-world object; determining a three-dimensional (3D) geometry corresponding to the object based on the at least one captured image; processing the at least one image to extract texture data for respective patches of the object; and populating at least a portion of a data structure for storing texture data, the data structure mapping the texture data to vertices in the 3D geometry, the 3D mesh comprising a 3D representation of the respective vertices in the 3D geometry and the texture map being the populated data structure.

Clause 3. The method of clause 2, further comprising caching the texture data for all vertices in a current camera frame by storing the populated data structure in a storage medium.

Clause 4. The method of clause 3, wherein populating the transformed vertices with texture data comprises: for each transformed vertex, determining whether the vertex of the 3D mesh is visible in the current camera frame; where the vertex of the 3D mesh is visible in the current camera frame, populating the transformed vertex with the texture data extracted at the corresponding visible vertex; and where the vertex of the 3D mesh is not visible in the current camera frame, accessing the populated data structure in the storage medium, obtain cached texture data for the vertex, and populating the transformed vertex with the cached texture data.

Clause 5. The method of any one of clauses 1 to 4, wherein tracking changes in localization of the device comprises: capturing at least one current image of the real-world object; identifying features in the at least one current image; tracking changes in location and orientation of the identified features; and processing the detected changes in localization and orientation of the identified features to generate a real-time camera pose relative to the object.

Clause 6. The method of any one of clauses 1 to 5, wherein the processor is a graphical processor unit (GPU).

Clause 7. The method of any one of clauses 1 to 6, wherein localization of the device is determined by a positioning system of the device.

Clause 8. The method of clause 7, wherein the positioning system comprises at least a first positioning hardware module coupled to a storage medium and the at least one processor of the device.

Clause 9. The method of clause 8, wherein the first positioning hardware module is a global positioning system (GPS) module.

Clause 10. The method of any one of clauses 1 to 9, wherein obtaining the first position estimate comprises receiving a user input position estimate.

Clause 11. The method of any one of clauses 1 to 10, wherein at least one vertex in the 3D mesh maps to two or more transformed vertices in the transformed geometry.

Clause 12. The method of clause 11, wherein the transformation includes a reflection, deformation, duplication, or translation.

Clause 13. The method of clause 11 or clause 12, wherein the transformation corresponds to a user gesture input into the device.

Clause 14. The method of clause 13, wherein the input gesture is a touch-screen input gesture.

Clause 15. The method of clause 13 or clause 14, wherein the input gesture includes a change in orientation in an input device while the input device is operated in a gesture input mode.

Clause 16. The method of any one of clauses 1 to 15, wherein obtaining a texture map and 3D mesh comprises: receiving the texture map and 3D mesh from a second device.

Clause 17. A computer-implemented method for displaying virtual content in a client device comprising, at a processor of the device: obtaining a texture map and a 3D mesh corresponding to a real-world object or environment; determining localization of the device relative to the real-world object or environment; tracking changes in localization of the device; in a sharing mode, receiving transformation information from a source device; generating virtual content by applying a shared transformation corresponding to the transformation information to the 3D mesh, the shared transformation mapping each of the vertices of the 3D mesh to transformed vertices in a transformed geometry and populating the transformed vertices with texture data according to the mapping and the texture map; and processing at least one current image of the real-world object, captured by an image sensor of the device, to superpose a view of the virtual content over the current image.

Clause 18. The method of clause 17, wherein the texture map is stored as a populated data structure in a storage medium in the device, the method further comprising replacing the texture data at vertices in the texture map by current texture data for all vertices visible in a current camera frame.

Clause 19. The method of clause 17 or clause 18, wherein populating the transformed vertices with texture data comprises: for each transformed vertex, determining whether the vertex of the 3D mesh is visible in the current camera frame; where the vertex of the 3D mesh is visible in the current camera frame, populating the transformed vertex with the texture data extracted at the corresponding visible vertex; and where the vertex of the 3D mesh is not visible in the current camera frame, accessing the populated data structure in the storage medium, obtaining cached texture data for the vertex, and populating the transformed vertex with the cached texture data.

Clause 20. A machine-readable medium comprising instructions that, when performed by a device, cause the device to perform a method comprising: obtaining a texture map and a three-dimensional (3D) geometry corresponding to a real 3D structure, the texture map being at least partially populated with texture data, there being a first mapping between points on the 3D geometry and coordinates in the texture map; tracking changes in localization of the device; entering a transformation input state; receiving a transformation input; generating virtual content by applying a transformation corresponding to the transformation input to the 3D geometry, the transformation being a second mapping from a plurality of points in the 3D geometry to a plurality of transformed points in a transformed 3D geometry and populating the transformed points with texture data according to the first and second mappings and the texture map; and processing at least one current image of the real-world object, captured by an image sensor of the device, to superpose a view of the virtual content over the current image.

Clause 21. The non-transitory machine-readable medium of clause 20 comprising further instructions that, when performed by a device, cause the device to perform further method steps of: determining localization of the device relative to the real 3D structure; establishing a communicative connection with an external device; transmitting a request message including information corresponding to the determined localization; and receiving the texture map and the 3D geometry from the external device in accordance with the determined localization.

Clause 22. The non-transitory machine-readable medium of clause 20 or clause 21, wherein obtaining the texture map and the 3D geometry comprises: receiving, from an image sensor of the device, at least one image of the real 3D structure; determining a 3D geometry corresponding to the 3D structure based on the at least one captured image, the 3D geometry comprising a 3D representation of respective points in the 3D structure; processing the at least one image to extract texture data for points of the 3D structure that are visible and not occluded in the at least one image; and populating at least a portion of a data structure with the extracted texture data according to the first mapping, the populated data structure being the texture map.

What is claimed is:

1. A computer-implemented method for displaying virtual content in a device comprising:
   accessing a texture map and a 3D mesh corresponding to a real-world object or environment;
   identifying a portion of the real-world object or environment that is visible in a current camera feed captured using an image sensor of the device;
   accessing modified texture data for the portion of the real-world object or environment directly from the current camera feed captured using the image sensor, wherein the modified texture data is created by:
   assigning a tracking reliability value to each frame captured from the image sensor, each tracking reliability value assigned based on data received by an inertial measurement unit sensor during capture of each frame; and
   creating the modified texture data using a weighted blending process, wherein the weights of the weighted blending process are based on the tracking reliability values;
   replacing texture data associated with the portion of the real-world object or environment in the texture map with the modified texture data;
   storing the modified texture data in association with the texture map;
   receiving a transformation input comprising a user gesture input into the device, the user gesture input based on a detected change in an orientation of the device;
   generating virtual content by applying a transformation corresponding to the transformation input to the 3D mesh, the transformation mapping a plurality of vertices of the 3D mesh to a plurality of transformed vertices in a transformed geometry and populating the transformed vertices with texture data according to the texture map, wherein the transformation comprises at least one of a reflection, a deformation, and a duplication; and
   processing at least one current image of the real-world object or environment, captured using the image sensor of the device, to superpose a view of the virtual content over the at least one current image.

2. The method of claim 1, wherein accessing the texture map and the 3D mesh comprises:
   capturing, using the image sensor of the device, the at least one current image of the real-world object or environment;

determining a three-dimensional (3D) geometry corresponding to the real-world object or environment based on the at least one current image;

processing the at least one current image to extract texture data for respective patches of the real-world object or environment; and populating at least a portion of a data structure for storing texture data, the data structure mapping the texture data to vertices in the 3D geometry, the 3D mesh comprising a 3D representation of the respective vertices in the 3D geometry and the texture map being the populated data structure.

3. The method of claim 2, further comprising caching the texture data for all vertices in a current camera frame by storing the populated data structure in a storage medium.

4. The method of claim 3, wherein populating the transformed vertices with texture data comprises:

for each transformed vertex, determining whether the vertex of the 3D mesh is visible in the current camera frame;

where the vertex of the 3D mesh is visible in the current camera frame, populating the transformed vertex with the texture data extracted at a corresponding visible vertex; and where the vertex of the 3D mesh is not visible in the current camera frame, accessing the populated data structure in the storage medium, obtain cached texture data for the vertex, and populating the transformed vertex with the cached texture data.

5. The method of claim 1, wherein accessing the texture map and the 3D mesh comprises:

determining localization of the device relative to the real-world object or environment; and retrieving the texture map and the 3D mesh from an external device in accordance with the determined localization, the external device being in communicative connection with the device.

6. The method of claim 1, wherein localization of the device is determined by a positioning system of the device.

7. The method of claim 6, wherein the positioning system comprises at least a first positioning hardware module coupled to a storage medium and at least one processor of the device.

8. The method of claim 7, wherein the first positioning hardware module is a global positioning system (GPS) module.

9. The method of claim 1, wherein tracking changes in localization of the device comprises:

capturing at least one current image of the real-world object or environment;

identifying features in the at least one current image;

tracking changes in location and orientation of the identified features; and processing the detected changes in localization and orientation of the identified features to generate a real-time camera pose relative to the real-world object or environment.

10. The method of claim 1, wherein at least one vertex in the 3D mesh maps to two or more transformed vertices in the transformed geometry.

11. The method of claim 1, wherein obtaining a texture map and 3D mesh comprises:

receiving the texture map and 3D mesh from a second device.

12. The method of claim 1, wherein the transformation comprises a deformation, the deformation comprising a uniform deformation of vertical lines into skewed curved lines.

13. The method of claim 1, wherein the transformation comprises a replication, the replication comprising a replication of at least a portion of the 3D mesh.

14. The method of claim 1, wherein the transformation comprises a reflection, the reflection comprising a reflection of at least some of the plurality of vertices of the 3D mesh.

15. A computer-implemented method for displaying virtual content in a device comprising, at a processor of the device:

obtaining a texture map and a 3D mesh corresponding to a real-world object or environment;

determining localization of the device relative to the real-world object or environment;

identifying a portion of the real-world object or environment that is visible in a current camera feed captured using an image sensor of the device;

accessing modified texture data for the portion of the real-world object or environment directly from the current camera feed captured using the image sensor;

replacing texture data associated with the portion of the real-world object or environment in the texture map with the modified texture data, wherein the modified texture data is created by:

assigning a tracking reliability value to each frame captured from the image sensor, each tracking reliability value assigned based on data received by an inertial measurement unit sensor during capture of each frame; and creating the modified texture data using a weighted blending process, wherein the weights of the weighted blending process are based on the tracking reliability values;

storing the modified texture data in association with the texture map;

receiving a transformation input from a source device;

generating virtual content by applying a transformation corresponding to the transformation input to the 3D mesh, the transformation mapping a plurality of vertices of the 3D mesh to a plurality of transformed vertices in a transformed geometry and populating the transformed vertices with texture data according the texture map, wherein the transformation comprises at least one of a reflection, a deformation, and a duplication; and processing at least one current image of the real-world object or environment, captured using the image sensor, to superpose a view of the virtual content over the at least one current image.

16. The method of claim 15, wherein the texture map is stored as a populated data structure in a storage medium in the device, the method further comprising replacing the texture data at vertices in the texture map by current texture data for all vertices visible in a current camera frame.

17. The method of claim 16, wherein populating the transformed vertices with texture data comprises:

for each transformed vertex, determining whether the vertex of the 3D mesh is visible in the current camera frame;

where the vertex of the 3D mesh is visible in the current camera frame, populating the transformed vertex with the texture data extracted at a corresponding visible vertex; and where the vertex of the 3D mesh is not visible in the current camera frame, accessing the populated data structure in the storage medium, obtaining cached texture data for the vertex, and populating the transformed vertex with the cached texture data.

18. A non-transitory machine-readable medium, comprising instructions that, when performed by a device, cause the device to perform a method comprising:
obtaining a texture map and a 3D mesh corresponding to a real-world object, the texture map being at least partially populated with texture data, there being a first mapping between points on the 3D mesh and coordinates in the texture map;
identifying a portion of the real-world object or environment that is visible in a current camera feed captured using an image sensor of the device;
accessing modified texture data for the portion of the of real-world object or environment directly from the current camera feed captured using the image sensor, wherein the modified texture data is created by:
assigning a tracking reliability value to each frame captured from the image sensor, each tracking reliability value assigned based on data received by an inertial measurement unit sensor during capture of each frame; and
creating the modified texture data using a weighted blending process, wherein the weights of the weighted blending process are based on the tracking reliability values;
replacing texture data associated with the portion of the real-world object or environment in the texture map with the modified texture data;
storing the modified texture data in association with the texture map;
entering a transformation input state;
receiving a transformation input comprising a user gesture input into the device, the user gesture input based on a detected change in an orientation of the device;
generating virtual content by applying a transformation corresponding to the transformation input to the 3D mesh, the transformation mapping a plurality of vertices of the 3D mesh to a plurality of transformed vertices in a transformed geometry and populating the transformed vertices with texture data according to the texture map, wherein the transformation comprises at least one of a reflection, a deformation, and a duplication; and
processing at least one current image of the real-world object or environment, captured using the image sensor of the device, to superpose a view of the virtual content over the at least one current image.

19. The non-transitory machine-readable medium of claim 18, comprising further instructions that, when performed by a device, cause the device to perform further method steps of:
determining localization of the device relative to the real-world object;
establishing a communicative connection with an external device;
transmitting a request message including information corresponding to the determined localization; and
receiving the texture map and the 3D mesh from the external device in accordance with the determined localization.

20. The non-transitory machine-readable medium of claim 18, wherein obtaining the texture map and the 3D mesh comprises:
receiving, from the image sensor, the at least one current image of the real-world object;
determining a 3D geometry corresponding to the real-world object based on the at least one current image, the 3D geometry comprising a 3D representation of respective points in the real-world object;
processing the at least one current image to extract texture data for points of the real-world object that are visible and not occluded in the at least one current image; and
populating at least a portion of a data structure with the extracted texture data according to the first mapping, the populated data structure being the texture map.

* * * * *